US012588045B2

(12) United States Patent
Duan et al.

(10) Patent No.: US 12,588,045 B2
(45) Date of Patent: Mar. 24, 2026

(54) RESOURCE ALLOCATION FOR JOINT COMMUNICATIONS AND RADIO FREQUENCY (RF) SENSING

(71) Applicant: QUALCOMM Incorporated, San Diego, CA (US)

(72) Inventors: Weimin Duan, San Diego, CA (US); Hung Dinh Ly, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 17/701,480

(22) Filed: Mar. 22, 2022

(65) Prior Publication Data

US 2023/0309132 A1     Sep. 28, 2023

(51) Int. Cl.
*H04W 72/54*      (2023.01)
*G01S 7/00*       (2006.01)
*G01S 7/02*       (2006.01)

(52) U.S. Cl.
CPC ............. *H04W 72/54* (2023.01); *G01S 7/006* (2013.01); *G01S 7/021* (2013.01)

(58) Field of Classification Search
CPC ........ G01S 13/931; G01S 7/023; G01S 7/003; G01S 7/006; G01S 7/021; H04W 64/003; H04W 4/04; H04W 72/54; H04W 72/50; H04W 72/53
See application file for complete search history.

(56) References Cited

U.S. PATENT DOCUMENTS 10,082,561 B2 *   9/2018  Wilson-Langman ........................
                                                      G01S 13/878
2021/0080580 A1 *  3/2021  Tsvelykh ................ G01S 17/48
(Continued)

FOREIGN PATENT DOCUMENTS

WO      2022008062 A1     1/2022

OTHER PUBLICATIONS

Oeschlin et al., Fully Adaptive Resource Management in Radar Networks, Dec. 4, 2020, IEEE, pp. 1-6 (Year: 2020).*
(Continued)

*Primary Examiner* — Vladimir Magloire
*Assistant Examiner* — Eric K Hodac
(74) *Attorney, Agent, or Firm* — QUALCOMM Incorporated

(57)          ABSTRACT

Systems and techniques for wireless communications are provided, including resource allocation for joint communications and RF sensing of objects. For example, a radar receiver (or component thereof) may determine a sensing measurement accuracy of the radar receiver based on one or more measurements associated with at least one target. The radar receiver (or component thereof) may transmit, based on the sensing measurement accuracy, a message to a network entity. The message may include an indication to modify an allocation of sensing resources associated with the radar receiver for communications data. The network entity (or component thereof) may receive the message from the radar receiver and may determine at least a portion of the sensing resources for the communications data. The radar receiver (or component thereof) may receive, from the network entity, resource allocation signaling for the communications data based on the indication to modify the allocation of sensing resources.

30 Claims, 18 Drawing Sheets

(56) References Cited

U.S. PATENT DOCUMENTS

| | | | |
|---|---|---|---|
| 2021/0270951 A1* | 9/2021 | Yoshizawa ............ | H04W 72/12 |
| 2023/0246668 A1* | 8/2023 | Zou ....................... | H04W 16/14 |
| | | | 455/552.1 |

OTHER PUBLICATIONS

International Search Report and Written Opinion—PCT/US2023/063072—ISA/EPO—Jun. 6, 2023.

* cited by examiner

Standard (TS 38.213) table of slot format

| Format | \multicolumn{14}{c}{Symbol number in a slot} | | | | | | | | | | | | | |
| --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | R | R | R | R | R | R | R | R | R | R | R | R | R | R |
| 3 | D | D | D | D | D | D | D | D | R | D | D | D | D | D |
| 4 | D | D | D | D | D | D | D | D | D | D | D | D | D | F |
| 5 | D | D | D | D | D | D | D | D | D | D | D | F | F | F |
| 6 | D | D | D | D | D | D | D | D | D | F | F | F | F | F |
| 7 | F | F | F | F | F | F | F | D | F | F | F | F | F | F |
| 8 | R | R | R | R | D | R | R | R | D | R | R | R | R | U |
| 9 | F | U | U | U | U | U | U | U | U | R | R | R | R | R |
| 10 | F | D | F | F | F | U | U | U | U | U | U | U | U | U |
| ... | | | | | | | | | | | | | | |
| 20 | D | D | F | F | F | F | F | D | F | F | F | F | F | U |
| 21 | D | D | D | F | F | F | F | U | F | F | F | F | F | U |
| 22 | D | F | F | F | F | F | U | D | F | F | F | U | U | U |
| ... | | | | | | | | | | | | | | |
| 54 | F | F | F | F | F | F | F | D | D | D | D | D | D | D |
| 55 | D | D | F | F | F | U | U | U | D | D | D | D | D | D |
| 56 – 254 | \multicolumn{14}{c}{Reserved} | | | | | | | | | | | | | |
| 255 | \multicolumn{14}{c}{UE determines the slot format for the slot based on semi-static TDD UL/DL configuration and, if any, on detected DCI formats} | | | | | | | | | | | | | |

CBG: Code Block Group

CB: Code Block

1400

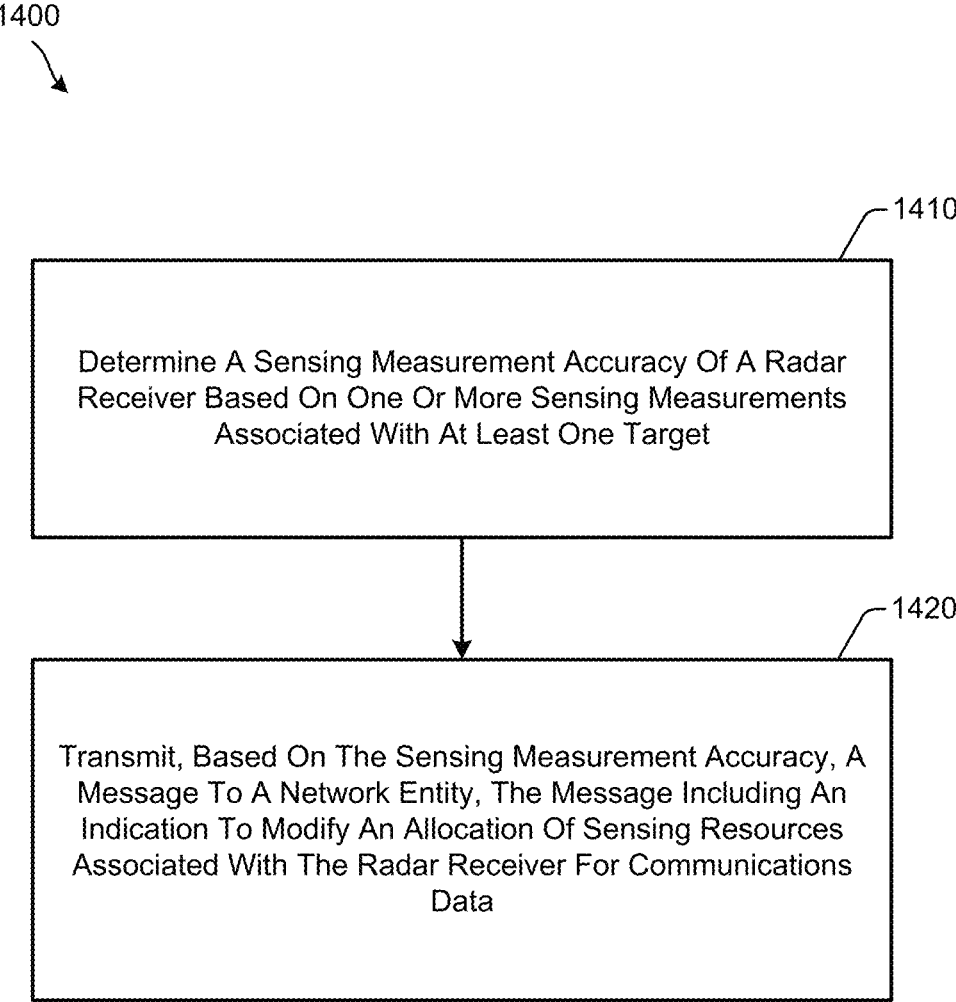

1410

Determine A Sensing Measurement Accuracy Of A Radar Receiver Based On One Or More Sensing Measurements Associated With At Least One Target

1420

Transmit, Based On The Sensing Measurement Accuracy, A Message To A Network Entity, The Message Including An Indication To Modify An Allocation Of Sensing Resources Associated With The Radar Receiver For Communications Data

Receive A Message From A Radar Receiver, The Message Including An Indication To Modify An Allocation Of Sensing Resources Associated With The Radar Receiver For Communications Data

1520

Determine, Based On The Message, At Least A Portion Of The Sensing Resources For The Communications Data

1600

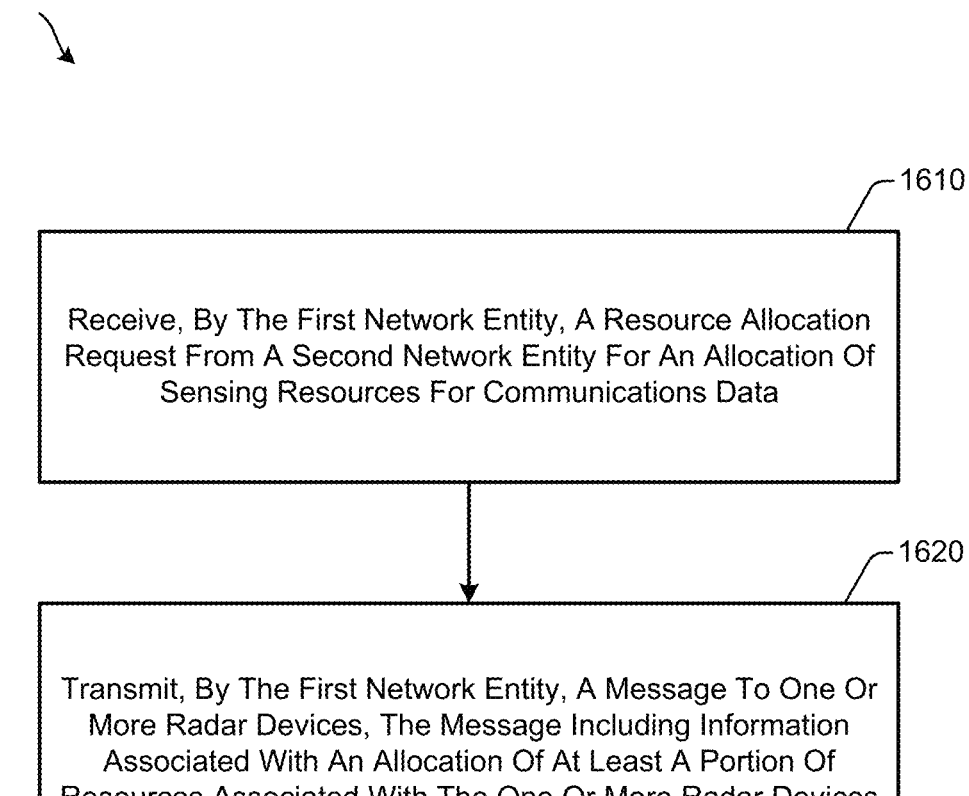

1610

Receive, By The First Network Entity, A Resource Allocation Request From A Second Network Entity For An Allocation Of Sensing Resources For Communications Data

1620

Transmit, By The First Network Entity, A Message To One Or More Radar Devices, The Message Including Information Associated With An Allocation Of At Least A Portion Of Resources Associated With The One Or More Radar Devices For The Communications Data

FIG. 16

RESOURCE ALLOCATION FOR JOINT COMMUNICATIONS AND RADIO FREQUENCY (RF) SENSING

FIELD OF THE DISCLOSURE

The present disclosure generally relates to resource allocation. For example, aspects of the disclosure relate to systems and techniques for resource allocation for joint communications and radio frequency (RF) sensing (e.g., monostatic, bistatic, and/or multistatic sensing) of target objects.

BACKGROUND OF THE DISCLOSURE

Wireless communications systems are widely deployed to provide various types of communication content, such as voice, video, packet data, messaging, and broadcast. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support communications between UEs, which may involve direct transmissions between two or more UEs.

Due to larger bandwidths being allocated for wireless cellular communications systems (e.g., including 5G and 5G beyond) and more use cases being introduced into the cellular communications systems, joint communications and RF sensing can be an essential feature for existing or future wireless communication systems, such as to enhance the overall spectral efficiency of the wireless communication networks.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for resource allocation for joint communications and RF sensing of target objects. According to at least one example, a method is provided for wireless communications. The method includes: determining a sensing measurement accuracy of the radar receiver based on one or more sensing measurements associated with at least one target; and transmitting, by the radar receiver based on the sensing measurement accuracy, a message to a network entity, the message including an indication to modify an allocation of sensing resources associated with the radar receiver for communications data.

In another example, an apparatus for wireless communications is provided that includes at least one memory (e.g., configured to store data, such as virtual content data, one or more images, etc.) and at least one processor (e.g., implemented in circuitry) coupled to the at least one memory. The at least one processor is configured to and can: determine a sensing measurement accuracy of the apparatus based on one or more sensing measurements associated with at least one target; and transmit, based on the sensing measurement accuracy, a message to a network entity, the message including an indication to modify an allocation of sensing resources associated with the apparatus for communications data.

In another example, a non-transitory computer-readable medium of a radar receiver is provided that has stored thereon instructions that, when executed by one or more processors, cause the one or more processors to: determine a sensing measurement accuracy of the radar receiver based on one or more sensing measurements associated with at least one target; and transmit, based on the sensing measurement accuracy, a message to a network entity, the message including an indication to modify an allocation of sensing resources associated with the radar receiver for communications data.

In another example, an apparatus for wireless communications is provided. The apparatus includes: means for determining a sensing measurement accuracy of the apparatus based on one or more sensing measurements associated with at least one target; and means for transmitting, based on the sensing measurement accuracy, a message to a network entity, the message including an indication to modify an allocation of sensing resources associated with the apparatus for communications data.

In some aspects, the apparatus is, or is part of, a mobile device (e.g., a mobile telephone or so-called "smart phone" or other mobile device), a wearable device, an extended reality (XR) device (e.g., a virtual reality (VR) device, an augmented reality (AR) device, or a mixed reality (MR) device), a personal computer, a laptop computer, a tablet computer, an Internet-of-Things (IoT) device, a wireless access point, a vehicle or component of a vehicle, a server computer, a robotics device, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 12 is a diagram illustrating an example of a slot format table that may be modified for slot format indicator (SFI)-based signaling, which may be employed by the disclosed systems and techniques for resource allocation for joint communications and RF sensing, in accordance with some examples.

FIG. 14 is a flow chart illustrating an example of a process for resource allocation for joint communications and RF sensing, in accordance with some examples.

FIG. 16 is a flow chart illustrating another example of a process for resource allocation for joint communications and RF sensing, in accordance with some examples.

DETAILED DESCRIPTION

Figure 1:
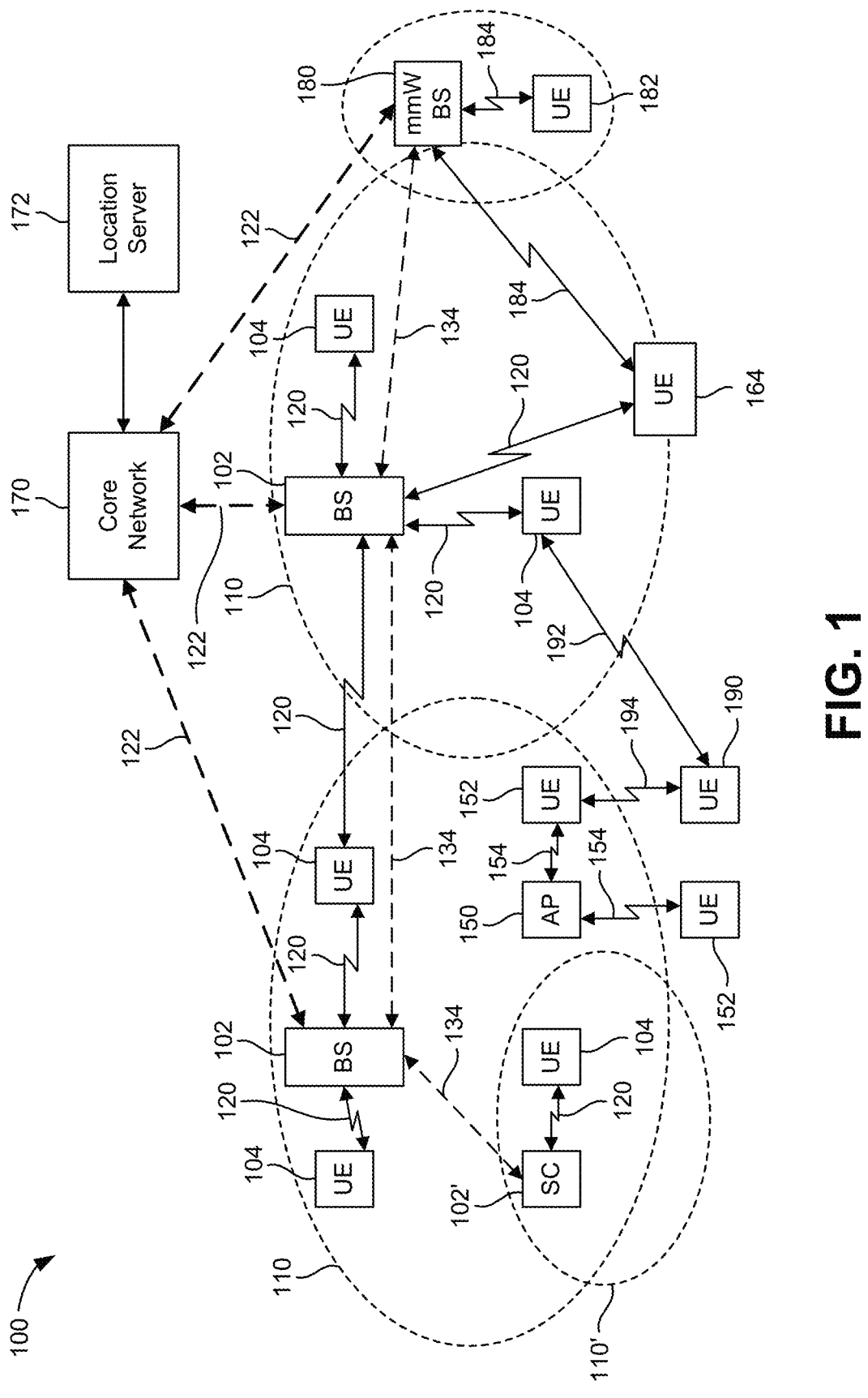
FIG. 1 is a block diagram illustrating an example of a wireless communication network that may be employed by the disclosed systems and techniques for resource allocation for joint communications and RF sensing, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

As previously mentioned, due to larger bandwidths being allocated for wireless communications systems (e.g., including cellular communications systems such as 4G/LTE, 5G/NR, and beyond) and more use cases being introduced into the wireless communications systems, joint communications and RF sensing can be an essential feature for wireless communications systems.

Radar sensing systems typically use RF waveforms to perform RF sensing to estimate the distance, angle, and/or velocity of a target object, such as a vehicle, an obstruction, a user, a building, or other object. A typical radar system includes at least one transmitter, at least one receiver, and at least one processor. A radar sensing system may perform monostatic sensing when one receiver is employed that is co-located with a transmitter. A radar system may perform bistatic sensing when one receiver of a first device is employed that is located remote from a transmitter of a second device. Similarly, a radar system may perform multistatic sensing when multiple receivers of multiple devices are employed that are all located remotely from at least one transmitter of at least one device.

During operation of a radar sensing system, a transmitter transmits an electromagnetic (EM) signal in the RF domain towards a target object. The signal reflects off of the target object to produce one or more reflection signals, which provides information or properties regarding the target, such as target object's location and speed. At least one receiver receives the one or more reflection signals and at least one processor, which may be associated with at least one receiver, utilizes the information from the one or more reflection signals to determine information or properties of the target object. A target object can also be referred herein as a target.

It should be noted that these radar sensing signals, which can be referred to as radar reference signals (RSs), are typically designed for and solely used for sensing purposes. Radar RSs do not contain any communications information.

Cellular communications systems are designed to transmit communications signals on designated communications frequency bands (e.g., 23 gigahertz (GHz), 3.5 GHz, etc. for 5G/NR, 2.2 GHz for LTE, among others). RF sensing systems are designed to transmit RF sensing signals on designated radar RF frequency bands (e.g., 77 GHz for autonomous driving). In traditional cellular communications systems or stand-alone RF sensing systems (e.g., systems which only perform RF sensing without communications), only the upper bounds of performance metrics for either communications or RF sensing, depending upon the system, are considered for the allocation of time and/or frequency resources. For example, for traditional RF sensing designs, only the upper bounds of associated performance metrics (e.g., operating range, maximum range, and the range/Doppler resolution) are considered for the time and/or frequency resource allocations, without any consideration for the sensing environment. On the other hand, the resource allocation for cellular communication systems consider at least the quality of service (QoS) for communications, the buffer status, and data traffic and channel conditions.

The spectrum for communication and sensing is very likely to be shared in future cellular communication systems, in which case the resource allocations (and associated performance metrics) for communications and RF sensing should be jointly considered. For instance, it can be beneficial to leverage the allotted frequency bands for RF sensing for cellular communications purposes, and/or to leverage the allotted frequency bands for communications for RF sensing purposes. In one example, if the communication system is overloaded, some resource scheduled for RF sensing may be considered for communications usage. Similarly, if the RF sensing system is overloaded, resources scheduled for communications may be considered for RF sensing usage.

In some aspects of the present disclosure, systems, apparatuses, methods (also referred to as processes), and computer-readable media (collectively referred to herein as "systems and techniques") are described herein that provide resource allocation for joint communications and RF sensing. In one or more examples, the systems and techniques of the present disclosure provide for allocation of resources (e.g., RF sensing resources) for communications purposes when those resources are not needed or are redundant. For example, as noted above, radar sensing signals are typically configured to meet the upper bounds of performance metrics (e.g., operating range, maximum range, and the range/Doppler resolution) without any consideration regarding the sensing environment (e.g., the sensing environment is not known prior to the scheduling of the RF sensing signals). If a radar receiver is able to achieve an acceptable sensing measurement accuracy (e.g., taking into account the sensing environment by using RF sensing measurements) without requiring all of the scheduled RF sensing signals, some of the sensing resources may be allocated for communications purposes. Considerations can also be made for leveraging resources scheduled for communications for RF sensing usage. Further details of such systems and techniques will be described herein.

Such systems and techniques for joint communications and RF sensing can provide for a very high spectral efficiency design for both communications and RF sensing that efficiently utilizes frequency bandwidth. Additional details regarding the disclosed systems and techniques for resource allocation for joint communications and RF sensing, as well as specific implementations, are described below with respect to the figures.

FIG. 1 illustrates an example of a wireless communications system 100 that may be employed by the disclosed systems and techniques for resource allocation for joint communications and RF sensing, according to various aspects. The wireless communications system 100 (which may also be referred to as a wireless wide area network (WWAN)) may include various base stations 102 and various user equipment devices (UEs) 104. As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof.

The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 (e.g., access links) between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies can be referred to as the FR2 band (e.g., including a frequency range of 24250 MHz to 52600 MHz). In some examples, the wireless communications system 100 can include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connect indirectly to one or more communication networks via one or more relay devices (e.g., UEs) by using device-to-device (D2D) peer-to-peer (P2P) links (referred to as "sidelinks"). In the example of FIG. 1, UE 190 has a D2D P2P link 192 with one of the UEs 104, which can be configured to operate as a relay device (e.g., through which UE 190 may indirectly communicate with base station 102). In another example, UE 190 also has a D2D P2P link 194 with WLAN STA 152, which is connected to the WLAN AP 150 and can be configured to operate as a relay device (e.g., UE 190 may indirectly communicate with AP 150). In an example, the D2D P2P links 192 and 194 may be supported with any well-known D2D RAT, such as LTE Direct (LTE-D), Wi-Fi Direct (Wi-Fi-D), Bluetooth®, UWB, and so on.

As noted above, UE 104 and UE 190 can be configured to communicate using sidelink communications. In some examples, UE 104 and UE 190 can operate using one or more different modes for sidelink communications. For example, in mode 1 the cellular network (e.g., base station 102) can select and manage the radio resources used by the UEs for performing sidelink communications. In another example, the UE 104 and UE 190 can be configured to operate using mode 2 in which the UEs can autonomously select the radio resources for sidelink communications. Mode 2 can operate without cellular coverage, and in some cases can be considered a baseline sidelink communications mode as devices and/or applications may not depend on the availability of cellular coverage. In some examples, mode 2 can include a distributed scheduling scheme for UEs to select radio resources.

In some aspects, UE 104 and UE 190 can be configured to implement a multi-beam unicast link for sidelink communications. In some examples, UE 104 and UE 190 can use PC5 radio resource control (RRC) protocol to establish and maintain a multi-beam unicast link that can be used for sidelink communications. In some cases, a sidelink transmission can include a request for feedback (e.g., a hybrid automatic repeat request (HARQ)) from the receiving UE. In some instances, the feedback request can be included in the sidelink control information (SCI) (e.g., SCI 1 in Physical Sidelink Control Channel (PSCCH) and/or SCI 2 in Physical Sidelink Shared Channel (PSSCH)). In some aspects, the feedback can correspond to an acknowledgement (ACK) or a negative acknowledgement (NACK).

In some examples, a transmitting UE (e.g., UE 104 and/or UE 190) can use feedback information to select and/or perform beam maintenance of beam pairs associated with a unicast link for sidelink communications. For example, a transmitting UE can maintain one or more counters associated with one or more beam pairs and/or one or more component beams. In some aspects, the counters can be used to determine the reliability of a component beam and/or a beam pair. In some cases, a transmitting UE may increment a counter for a beam pair and/or a component beam based on a discontinuous transmission (DTX). For example, a transmitting UE may increment a counter for a component beam and/or a beam pair if it does not receive any response to a request for feedback for an associated sidelink transmission (e.g., receiving UE fails to decode SCI). In another example, a transmitting UE may increment a counter for a component beam and/or a beam pair if it receives a NACK in response to a sidelink transmission.

In some cases, a transmitting UE may initiate beam refinement based on a value of a counter corresponding to a number of DTXs associated with a component beam and/or a beam pair. In some aspects, a transmitting UE may initiate beam recovery based on a value of a counter corresponding to a number of DTXs associated with a component beam and/or a beam pair. In some examples, a transmitting UE may detect radio link failure (RLF) based on a value of a counter corresponding to a number of DTXs associated with a component beam and/or a beam pair.

Figure 2:
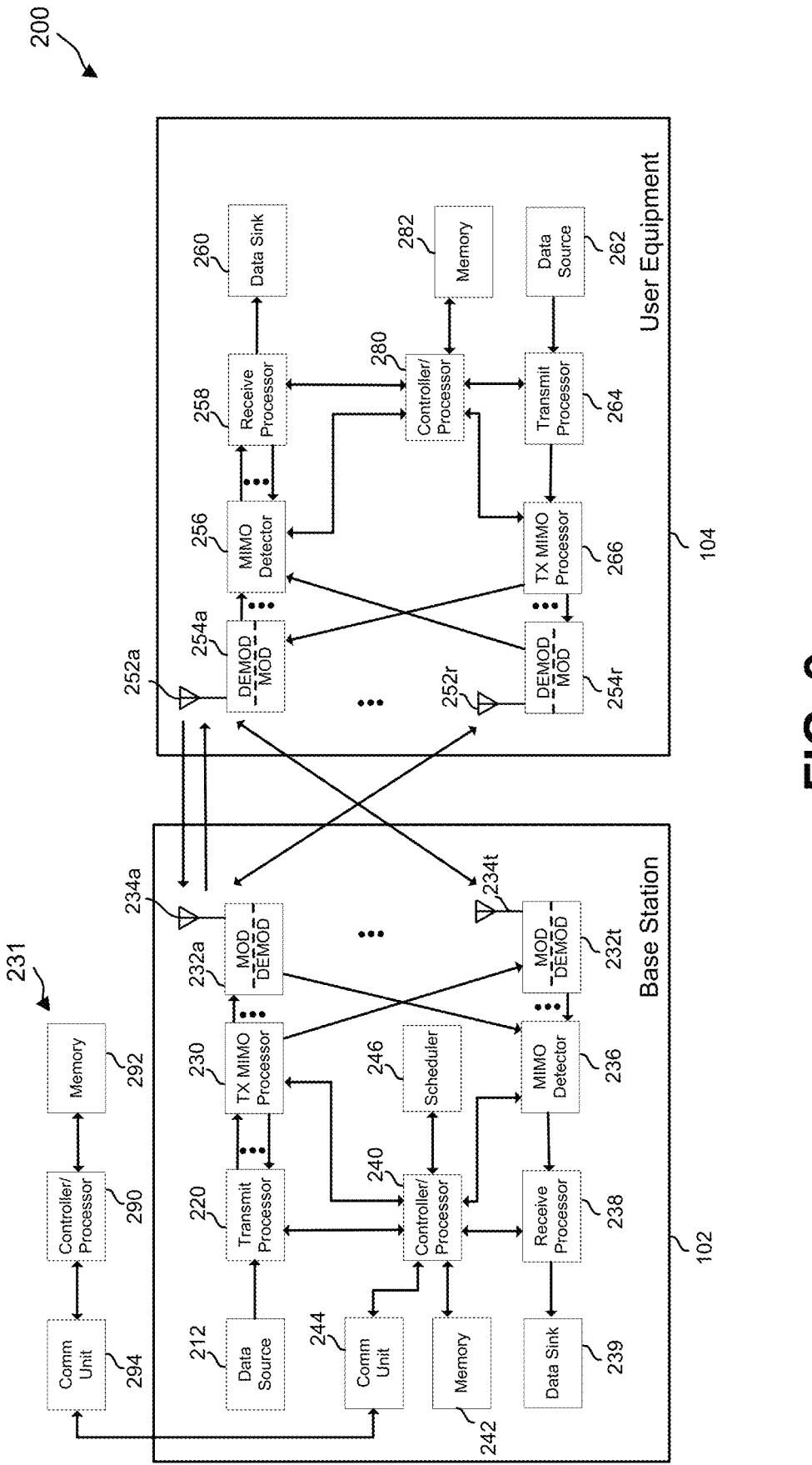
FIG. 2 is a diagram illustrating a design of a base station and a User Equipment (UE) device that enable transmission and processing of signals exchanged between the UE and the base station, which may be employed by the disclosed systems and techniques for resource allocation for joint communications and RF sensing, in accordance with some examples.

FIG. 2 shows a block diagram of a design of a base station 102 and a UE 104 that enable transmission and processing of signals exchanged between the UE and the base station, which may be employed by the disclosed systems and techniques for resource allocation for joint communications and RF sensing, in accordance with some aspects of the present disclosure. Design 200 includes components of a base station 102 and a UE 104, which may be one of the base stations 102 and one of the UEs 104 in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream, e.g., for an orthogonal frequency-division multiplexing (OFDM) scheme and/or the like, to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254a through 254r (e.g., for DFT-s-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with resource allocation for joint communications and RF sensing.

Memories 242 and 282 may store data and program codes for the base station 102 and the UE 104, respectively. A scheduler 246 may schedule UEs for data transmission on the downlink, uplink, and/or sidelink.

In some implementations, the UE 104 may include a radar receiver that includes: means for determining a sensing measurement accuracy of the radar receiver based on one or more sensing measurements associated with at least one target; and means for transmitting, based on the sensing measurement accuracy, a message to a network entity, the message including an indication to modify an allocation of sensing resources associated with the radar receiver for communications data. In some examples, the means for determining can include controller/processor 280, memory 282, receive processor 258, transmit processor 264, any combination thereof, or any other component(s) of the UE 104. In some examples, the means for transmitting can include controller/processor 280, transmit processor 264, TX MIMO processor 266, DEMODs 254a through 254r, antennas 252a through 252r, any combination thereof, or any other component(s) of the UE 104.

In some implementations, the base station 102 may include: means for receiving a message from a radar receiver, the message including an indication to modify an allocation of sensing resources associated with the radar receiver for communications data; and means for determining, based on the message, at least a portion of the sensing resources for the communications data. In some examples, the means for receiving can include controller/processor 240, transmit processor 224, TX MIMO processor 236, DEMODs 232a through 232t, antennas 234a through 234t, the scheduler 246, any combination thereof, or any other component(s) of the base station 102. In some examples, the means for determining can include controller/processor 240, memory 242, receive processor 238, transmit processor 220, the scheduler 246, any combination thereof, or any other component(s) of the base station 102.

In some implementations, the base station 102 may include: means for receiving a resource allocation request from a second network entity for an allocation of sensing resources for communications data; and means for transmitting a message to one or more radar devices, the message including information associated with an allocation of at least a portion of resources associated with the one or more radar devices for the communications data. In some examples, the means for receiving can include controller/processor 240, transmit processor 224, TX MIMO processor 236, DEMODs 232a through 232t, antennas 234a through 234t, the scheduler 246, any combination thereof, or any other component(s) of the base station 102. In some examples, the means for transmitting can include controller/processor 240, transmit processor 224, TX MIMO processor 236, DEMODs 232a through 232t, antennas 234a through 234t, the scheduler 246, any combination thereof, or any other component(s) of the base station 102.

Figure 3:
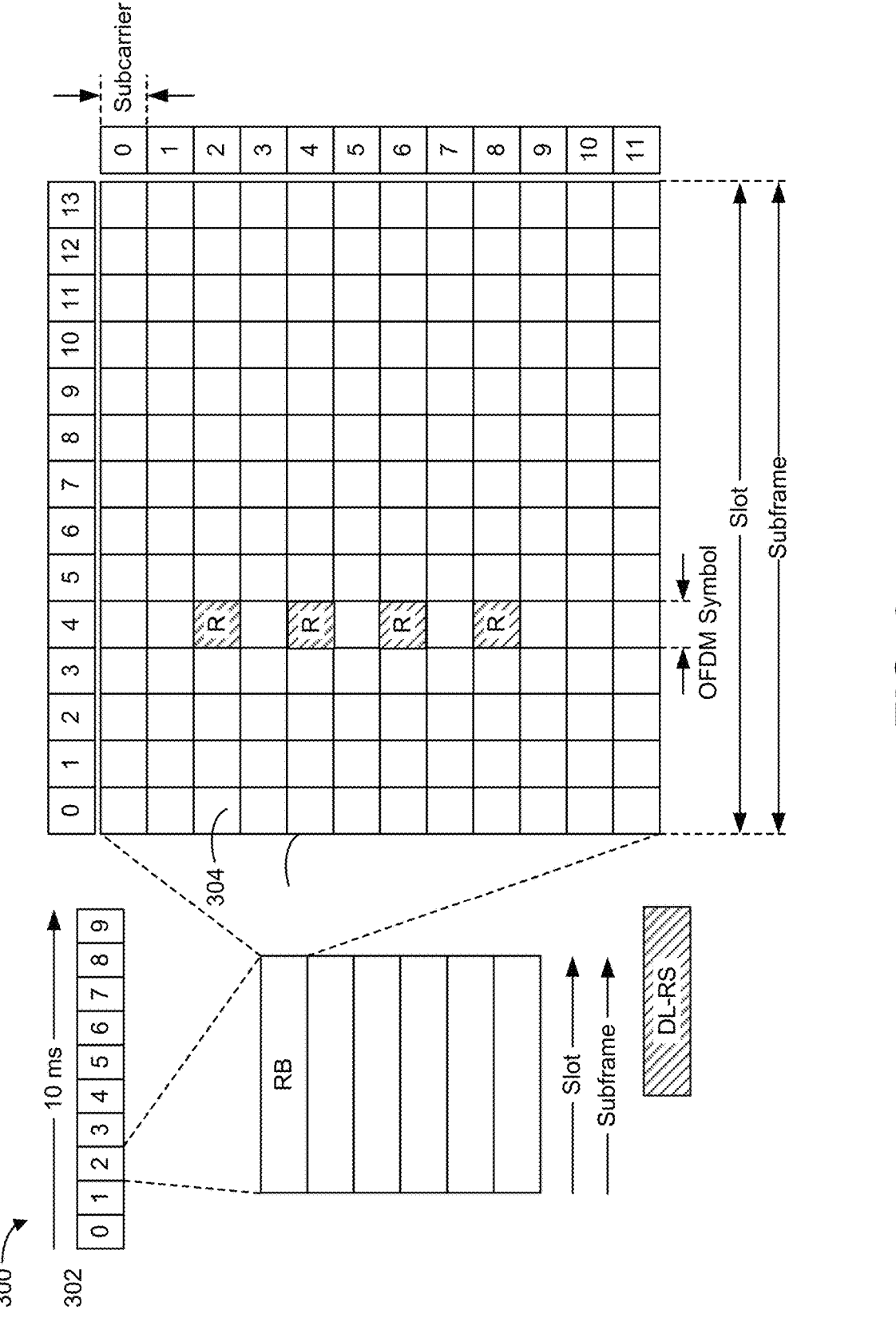
FIG. 3 is a diagram illustrating an example of a frame structure, which may be employed by the disclosed systems and techniques for resource allocation for joint communications and RF sensing, in accordance with some examples.

Various radio frame structures may be used to support downlink, uplink, and sidelink transmissions between network nodes (e.g., base stations and UEs). FIG. 3 is a diagram 300 illustrating an example of a frame structure, which may be employed by the disclosed systems and techniques for resource allocation for joint communications and RF sensing (e.g., for signaling regarding an allocation of resources for communications purposes), according to some aspects of the disclosure. Other wireless communications technologies may have different frame structures and/or different channels.

NR (and LTE) utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (O. For example, subcarrier spacing (SCS) of 15 kHz, 30 kHz, 60 kHz, 120 kHz, and 240 kHz or greater may be available. Table 1 provided below lists some various parameters for different NR numerologies.

TABLE 1

| | SCS (kHz) | Symbols/Sot | Slots/Subframe | Slots/Frame | Slot Duration (ms) | Symbol Duration (µs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In one example, a numerology of 15 kHz is used. Thus, in the time domain, a 10 millisecond (ms) frame is divided into 10 equally sized subframes of 1 ms each, and each subframe includes one time slot. In FIG. 3, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. FIG. 3 illustrates an example of a resource block (RB) 302. The resource grid is further divided into multiple resource elements (REs). Referring to FIG. 3, the RB 302 includes multiple REs, including the resource element (RE) 304. The RE 304 may correspond to one symbol length in the time domain and one subcarrier in the frequency domain. In the numerology of FIG. 3, for a normal cyclic prefix, RB 302 may contain 12 consecutive subcarriers in the frequency domain and seven consecutive symbols in the time domain, for a total of 84 REs such as RE 304. For an extended cyclic prefix, an RB may contain 12 consecutive subcarriers in the frequency domain and six consecutive symbols in the time domain, for a total of 72 REs. The number of bits carried by each RE depends on the modulation scheme.

In some aspects, some REs can be used to transmit downlink reference (pilot) signals (DL-RS). The DL-RS can include Positioning Reference Signal (PRS), Tracking Reference Signal (TRS), Phase Tracking Reference Signal (PTRS), Channel State Information Reference Signal (CSI-RS), Demodulation Reference Signal (DMRS), Primary Synchronization Signal (PSS), Secondary Synchronization Signal (SSS), etc. The resource grid if FIG. 3 illustrates exemplary locations of REs used to transmit DL-RS (labeled "R").

In some aspects, one or more resources in the resource grid can be used to perform sidelink communications. For example, sidelink communications can be implemented using a mode (e.g., mode 1) in which a base station (e.g., base station 102) can designate/select one or more resources (e.g., resource elements (e.g., RE 304), resource blocks (e.g., RB 302), subcarriers, symbols, frames, sub-frames, etc.) for sidelink communications. In another example, sidelink communications can be implemented using a mode (e.g., mode 2) in which a UE (e.g., UE 104) can designate/select one or more resources (e.g., resource elements (e.g., RE 304), resource blocks (e.g., RB 302), subcarriers, symbols, frames, sub-frames, etc.) for sidelink communications. In some aspects, resource allocation for sidelink communications can correspond to one or more subchannels in the frequency domain and one or more slots in the time domain. In some cases, a subchannel may include from 10 RBs to 100 RBs. In some examples, a sidelink slot may include 7-14 OFDM symbols.

In some examples, a UE (e.g., UE 104) can be configured to receive a sidelink packet by performing blind decoding of all sidelink subchannels. In some aspects, the sidelink UE can decode a Physical Sidelink Control Channel (PSCCH) in a configured sidelink resource pool. In some cases, the PSCCH can be used to carry sidelink control information (SCI) which contains information about the resource allocation on the Physical Sidelink Shared Channel (PSSCH). For example, a first stage SCI can be transmitted in PSCCH and may include information regarding the PSSCH bandwidth as well as resource reservations in future slots. In some cases, a second stage SCI can be located and decoded after decoding PSCCH. In some aspects, a source identifier and/or a destination identifier can be used to determine a source and/or destination UE associated with a packet. In some examples, the UE can proceed with decoding PSSCH if PSCCH (e.g., SCI) indicates a receiver ID matching the UE's ID. In some configurations, PSCCH and PSSCH can be transmitted using the same slot.

In some examples, PSCCH may be configured to occupy or use multiple RBs in a single subchannel. In some aspects, a subchannel can occupy multiple PRBs (e.g., a subchannel can occupy 10, 15, 20, 25, 50, 75, 100 PRBs). In some cases, PSCCH may be configured to occupy 10, 12, 15, 20, or 25 PRBs in a subchannel. In some aspects, PSCCH may be limited to one subchannel. In some cases, the duration of PSCCH can be configured use 2 or 3 symbols. In some aspects, a resource pool (RP) can include any number of subchannels (e.g., a RP can include 1-27 subchannels). In some cases, the size of PSCCH may be fixed for a RP (e.g., size can correspond to 10% to 100% of a subchannel). In some examples, PSSCH may occupy 1 or more subchannels and may include a second stage SCI.

Figure 4:
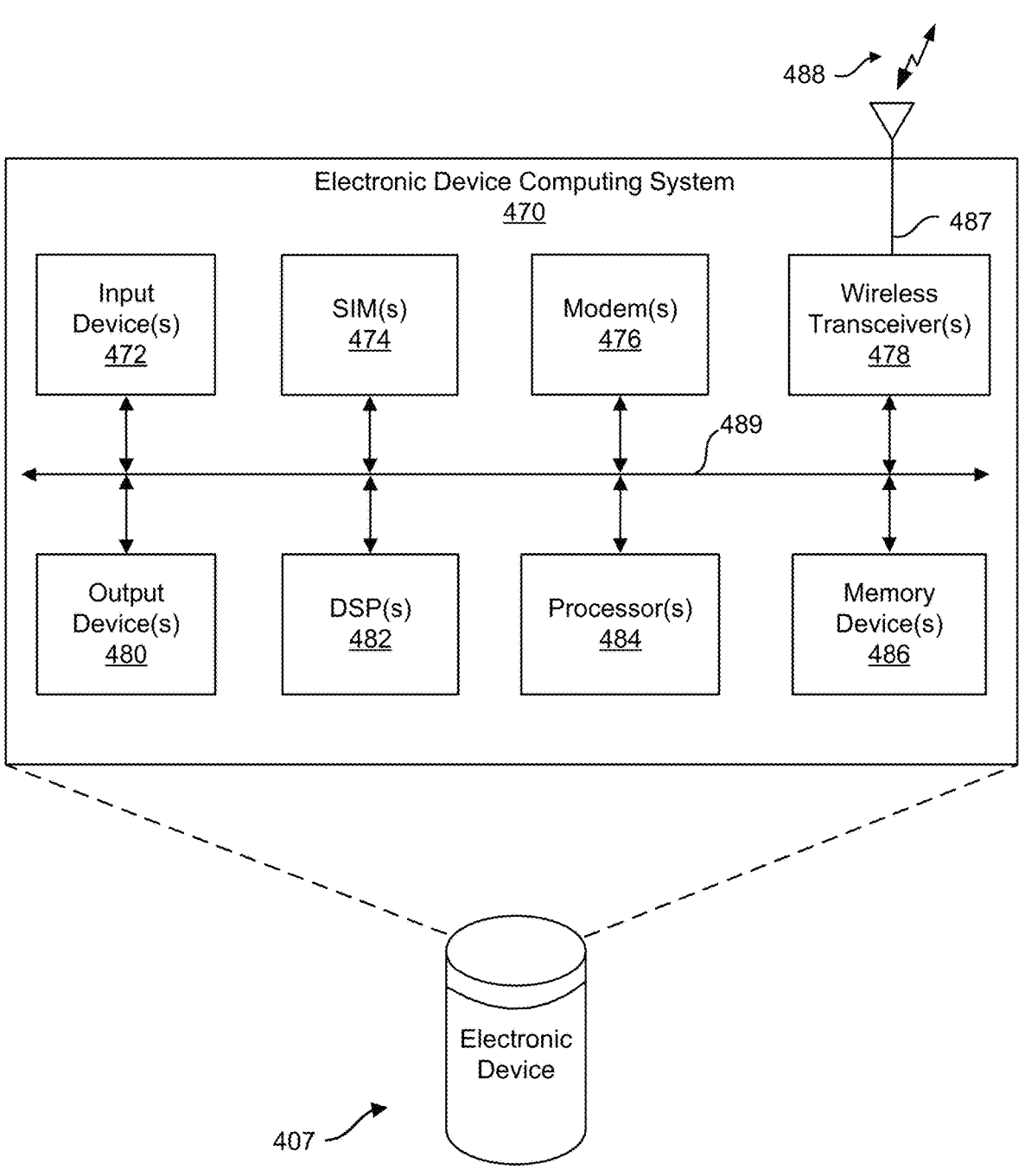
FIG. 4 is a block diagram illustrating an example of a computing system of an electronic device that may be employed by the disclosed systems and techniques for resource allocation for joint communications and RF sensing, in accordance with some examples.

FIG. 4 is a block diagram illustrating an example of a computing system 470 of an electronic device 407 that may be employed by the disclosed systems and techniques for resource allocation for joint communications and RF sensing, in accordance with some examples. The electronic device 407 is an example of a device that can include hardware and software for the purpose of connecting and exchanging data with other devices and systems using a communications network (e.g., a 3$^{rd}$ Generation Partnership network, such as a 5$^{th}$ Generation (5G)/New Radio (NR) network, a 4$^{th}$ Generation (4G)/Long Term Evolution (LTE) network, a WiFi network, or other communications network). For example, the electronic device 407 can include, or be a part of, a mobile device (e.g., a mobile telephone), a wearable device (e.g., a network-connected or smart watch), an extended reality device (e.g., a virtual reality (VR) device, an augmented reality (AR) device, or a mixed reality (MR) device), a personal computer, a laptop computer, a tablet computer, an Internet-of-Things (IoT) device, a wireless access point, a router, a vehicle or component of a vehicle, a server computer, a robotics device, and/or other device used by a user to communicate over a wireless communications network. In some cases, the device 407 can be referred to as user equipment (UE), such as when referring to a device configured to communicate using 5G/NR, 4G/LTE, or other telecommunication standard. In some cases, the device can be referred to as a station (STA), such as when referring to a device configured to communicate using the Wi-Fi standard.

The computing system 470 includes software and hardware components that can be electrically or communicatively coupled via a bus 489 (or may otherwise be in communication, as appropriate). For example, the computing system 470 includes one or more processors 484. The one or more processors 484 can include one or more CPUs, ASICs, FPGAs, APs, GPUs, VPUs, NSPs, microcontrollers, dedicated hardware, any combination thereof, and/or other processing device/s and/or system/s. The bus 489 can be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone or a microphone array, and/or the like), and one or more output devices 480 (e.g., a display, a speaker, a printer, and/or the like).

The one or more wireless transceivers 478 can receive wireless signals (e.g., signal 488) via antenna 487 from one or more other devices, such as other user devices, network devices (e.g., base stations such as evolved Node Bs (eNBs) and/or gNodeBs (gNBs), WiFi access points (APs) such as routers, range extenders or the like, etc.), cloud networks, and/or the like. In some examples, the computing system 470 can include multiple antennas or an antenna array that can facilitate simultaneous transmit and receive functionality. Antenna 487 can be an omnidirectional antenna such that RF signals can be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 488 into a baseband or intermediate frequency and can convert the RF signals to the digital domain.

In some cases, the computing system 470 can include a coding-decoding device (or CODEC) configured to encode and/or decode data transmitted and/or received using the one or more wireless transceivers 478. In some cases, the computing system 470 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 478.

The one or more SIMs 474 can each securely store an international mobile subscriber identity (IMSI) number and related key assigned to the user of the electronic device 407. The IMSI and key can be used to identify and authenticate the subscriber when accessing a network provided by a network service provider or operator associated with the one or more SIMs 474. The one or more modems 476 can modulate one or more signals to encode information for transmission using the one or more wireless transceivers 478. The one or more modems 476 can also demodulate signals received by the one or more wireless transceivers 478 in order to decode the transmitted information. In some examples, the one or more modems 476 can include a WiFi modem, a 4G (or LTE) modem, a 5G (or NR) modem, and/or other types of modems. The one or more modems 476 and the one or more wireless transceivers 478 can be used for communicating data for the one or more SIMs 474.

The computing system 470 can also include (and/or be in communication with) one or more non-transitory machine-readable storage media or storage devices (e.g., one or more memory devices 486), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 can also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

In some aspects, the electronic device 407 can include means for performing operations described herein. The means can include one or more of the components of the computing system 470. For example, the means for performing operations described herein may include one or more of input device(s) 472, SIM(s) 474, modems(s) 476, wireless transceiver(s) 478, output device(s) 480, DSP(s) 482, processors 484, memory device(s) 486, and/or antenna(s) 487.

In some aspects, the electronic device 407 can include means for determining a sensing measurement accuracy of the radar receiver based on one or more sensing measurements associated with at least one target and means for transmitting a message to a network entity, the message including an indication to modify an allocation of sensing resources associated with the radar receiver for communications data. In some examples, any or all of these means can include the one or more wireless transceivers 478, the one or more modems 476, the one or more processors 484, the one or more DSPs 482, the one or more memory devices 486, any combination thereof, or other component(s) of the electronic device 407.

Figure 5:
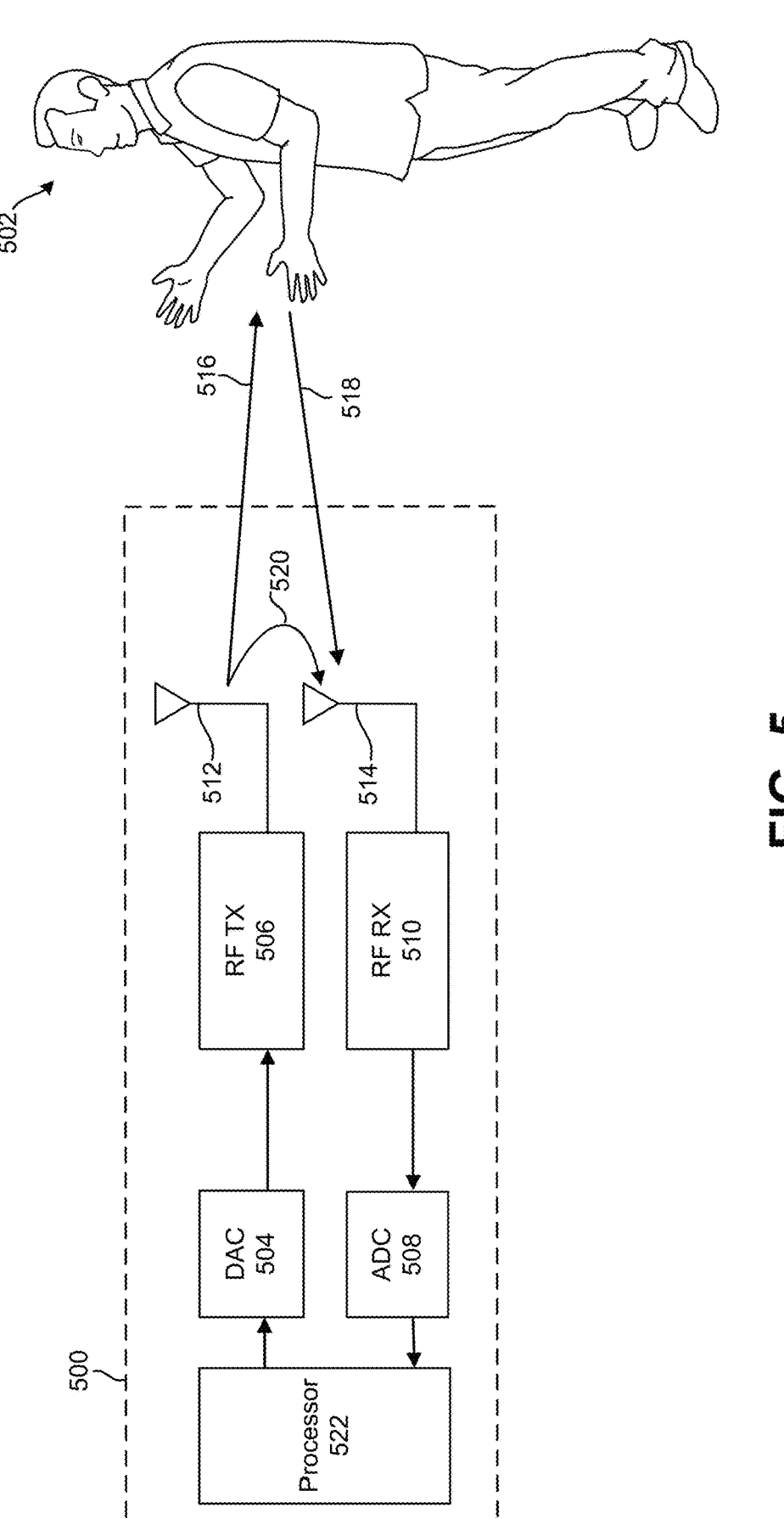
FIG. 5 is a diagram illustrating an example of a wireless device utilizing RF monostatic sensing techniques, which may be employed by the disclosed systems and techniques for resource allocation for joint communications and RF sensing, to determine one or more characteristics of a target object, in accordance with some examples.

FIG. 5 is a diagram illustrating an example of a wireless device 500 utilizing RF monostatic sensing techniques, which may be employed by the disclosed systems and techniques for resource allocation for joint communications and RF sensing, to determine one or more characteristics (e.g., location, speed or velocity, heading, etc.) of a target 502 object, in accordance with some examples. In particular, FIG. 5 is a diagram illustrating an example of a wireless device 500 (e.g., a transmit/receive sensing node) that utilizes RF sensing techniques (e.g., monostatic sensing) to perform one or more functions, such as detecting a presence and location of a target 502 (e.g., an object, user, or vehicle), which in this figure is illustrated in the form of a user (e.g., a person).

In some examples, the wireless device 500 can be a mobile phone, a tablet computer, a wearable device, a vehicle, an extending reality (XR) device, a computing device or component of a vehicle, or other device (e.g., device 407 of FIG. 4) that includes at least one RF interface. In some examples, the wireless device 500 can be a device that provides connectivity for a user device (e.g., for electronic device 407 of FIG. 4), such as a base station (e.g., a gNB, eNB, etc.), a wireless access point (AP), or other device that includes at least one RF interface.

In some aspects, wireless device 500 can include one or more components for transmitting an RF signal. The wireless device 500 can include at least one processor 522 for generating a digital signal or waveform. The wireless device 500 can also include a digital-to-analog converter (DAC) 504 that is capable of receiving the digital signal or waveform from the processor(s) 522 (e.g., a microprocessor), and converting the digital signal or waveform to an analog waveform. The analog signal that is the output of the DAC 504 can be provided to RF transmitter 506 for transmission. The RF transmitter 506 can be a Wi-Fi transmitter, a 5G/NR transmitter, a Bluetooth™ transmitter, or any other transmitter capable of transmitting an RF signal.

RF transmitter 506 can be coupled to one or more transmitting antennas such as Tx antenna 512. In some examples, transmit (Tx) antenna 512 can be an omnidirectional antenna that is capable of transmitting an RF signal in all directions. For example, Tx antenna 512 can be an omnidirectional Wi-Fi antenna that can radiate Wi-Fi signals (e.g., 2.4 GHz, 5 GHz, 6 GHz, etc.) in a 360-degree radiation pattern. In another example, Tx antenna 512 can be a directional antenna that transmits an RF signal in a particular direction.

In some examples, wireless device 500 can also include one or more components for receiving an RF signal. For example, the receiver lineup in wireless device 500 can include one or more receiving antennas such as a receive (Rx) antenna 514. In some examples, Rx antenna 514 can be an omnidirectional antenna capable of receiving RF signals from multiple directions. In other examples, Rx antenna 514 can be a directional antenna that is configured to receive signals from a particular direction. In further examples, both the Tx antenna 512 and the Rx antenna 514 can include multiple antennas (e.g., elements) configured as an antenna array.

Wireless device 500 can also include an RF receiver 510 that is coupled to Rx antenna 514. RF receiver 510 can include one or more hardware components for receiving an RF waveform such as a Wi-Fi signal, a Bluetooth™ signal, a 5G/NR signal, or any other RF signal. The output of RF receiver 510 can be coupled to an analog-to-digital converter (ADC) 508. ADC 508 can be configured to convert the received analog RF waveform into a digital waveform. The digital waveform that is the output of the ADC 508 can be provided to the processor(s) 522 for processing. The processor(s) 522 (e.g., a digital signal processor (DSP)) can be configured for processing the digital waveform.

In one example, wireless device 500 can implement RF sensing techniques, for example monostatic sensing techniques, by causing a Tx waveform 516 to be transmitted from Tx antenna 512. Although Tx waveform 516 is illustrated as a single line, in some cases, Tx waveform 516 can be transmitted in all directions by an omnidirectional Tx antenna 512. In one example, Tx waveform 516 can be a Wi-Fi waveform that is transmitted by a Wi-Fi transmitter in wireless device 500. In some cases, Tx waveform 516 can correspond to a Wi-Fi waveform that is transmitted at or near the same time as a Wi-Fi data communication signal or a Wi-Fi control function signal (e.g., a beacon transmission). In some examples, Tx waveform 516 can be transmitted using the same or a similar frequency resource as a Wi-Fi data communication signal or a Wi-Fi control function signal (e.g., a beacon transmission). In some aspects, Tx waveform 516 can correspond to a Wi-Fi waveform that is transmitted separately from a Wi-Fi data communication signal and/or a Wi-Fi control signal (e.g., Tx waveform 516 can be transmitted at different times and/or using a different frequency resource).

In some examples, Tx waveform 516 can correspond to a 5G NR waveform that is transmitted at or near the same time as a 5G NR data communication signal or a 5G NR control function signal. In some examples, Tx waveform 516 can be transmitted using the same or a similar frequency resource as a 5G NR data communication signal or a 5G NR control function signal. In some aspects, Tx waveform 516 can correspond to a 5G NR waveform that is transmitted separately from a 5G NR data communication signal and/or a 5G NR control signal (e.g., Tx waveform 516 can be transmitted at different times and/or using a different frequency resource).

In some aspects, one or more parameters associated with Tx waveform 516 can be modified that may be used to increase or decrease RF sensing resolution. The parameters may include frequency, bandwidth, number of spatial streams, the number of antennas configured to transmit Tx waveform 516, the number of antennas configured to receive a reflected RF signal (e.g., Rx waveform 518) corresponding to Tx waveform 516, the number of spatial links (e.g., number of spatial streams multiplied by number of antennas configured to receive an RF signal), the sampling rate, or any combination thereof. The transmitted waveform (e.g., Tx waveform 516) and the received waveform (e.g., Rx waveform 518) can include one or more RF sensing signals, which are also referred to as radar reference signals (RSs).

In further examples, Tx waveform 516 can be implemented to have a sequence that has perfect or almost perfect autocorrelation properties. For instance, Tx waveform 516 can include single carrier Zadoff sequences or can include symbols that are similar to orthogonal frequency-division multiplexing (OFDM) Long Training Field (LTF) symbols. In some cases, Tx waveform 516 can include a chirp signal, as used, for example, in a Frequency-Modulated Continuous-Wave (FM-CW) radar system. In some configurations, the chirp signal can include a signal in which the signal frequency increases and/or decreases periodically in a linear and/or an exponential manner.

In some aspects, wireless device 500 can implement RF sensing techniques by performing alternating transmit and receive functions (e.g., performing a half-duplex operation). For example, wireless device 500 can alternately enable its RF transmitter 506 to transmit the Tx waveform 516 when the RF receiver 510 is not enabled to receive (i.e. not receiving), and enable its RF receiver 510 to receive the Rx waveform 518 when the RF transmitter 506 is not enabled to transmit (i.e. not transmitting). When the wireless device 500 is performing a half-duplex operation, the wireless device 500 may transmit Tx waveform 516, which may be a radar RS (e.g., sensing signal).

In other aspects, wireless device 500 can implement RF sensing techniques by performing concurrent transmit and receive functions (e.g., performing a sub-band or full-band full-duplex operation). For example, wireless device 500 can enable its RF receiver 510 to receive at or near the same time as it enables RF transmitter 506 to transmit Tx waveform 516. When the wireless device 500 is performing a full-duplex operation (e.g., either sub-band full-duplex or full-band full-duplex), the wireless device 500 may transmit Tx waveform 516, which may be a radar RS (e.g., sensing signal).

In some examples, transmission of a sequence or pattern that is included in Tx waveform 516 can be repeated continuously such that the sequence is transmitted a certain number of times or for a certain duration of time. In some examples, repeating a pattern in the transmission of Tx waveform 516 can be used to avoid missing the reception of any reflected signals if RF receiver 510 is enabled after RF transmitter 506. In one example implementation, Tx waveform 516 can include a sequence having a sequence length L that is transmitted two or more times, which can allow RF receiver 510 to be enabled at a time less than or equal to L in order to receive reflections corresponding to the entire sequence without missing any information.

By implementing alternating or simultaneous transmit and receive functionality (e.g. half-duplex or full-duplex operation), wireless device 500 can receive signals that correspond to Tx waveform 516. For example, wireless device 500 can receive signals that are reflected from objects or people that are within range of Tx waveform 516, such as Rx waveform 518 reflected from target 502. Wireless device 500 can also receive leakage signals (e.g., Tx leakage signal 520) that are coupled directly from Tx antenna 512 to Rx antenna 514 without reflecting from any objects. For example, leakage signals can include signals that are transferred from a transmitter antenna (e.g., Tx antenna 512) on a wireless device to a receive antenna (e.g., Rx antenna 514) on the wireless device without reflecting from any objects. In some cases, Rx waveform 518 can include multiple sequences that correspond to multiple copies of a sequence that are included in Tx waveform 516. In some examples, wireless device 500 can combine the multiple sequences that are received by RF receiver 510 to improve the signal to noise ratio (SNR).

Wireless device 500 can further implement RF sensing techniques by obtaining RF sensing data associated with each of the received signals corresponding to Tx waveform 516. In some examples, the RF sensing data can include channel state information (CSI) data relating to the direct paths (e.g., leakage signal 520) of Tx waveform 516 together with data relating to the reflected paths (e.g., Rx waveform 518) that correspond to Tx waveform 516.

In some aspects, RF sensing data (e.g., CSI data) can include information that can be used to determine the manner in which an RF signal (e.g., Tx waveform 516) propagates from RF transmitter 506 to RF receiver 510. RF sensing data can include data that corresponds to the effects on the transmitted RF signal due to scattering, fading, and/or power decay with distance, or any combination thereof. In some examples, RF sensing data can include imaginary data and real data (e.g., I/Q components) corresponding to each tone in the frequency domain over a particular bandwidth.

In some examples, RF sensing data can be used by the processor(s) 522 to calculate distances and angles of arrival that correspond to reflected waveforms, such as Rx waveform 518. In further examples, RF sensing data can also be used to detect motion, determine location, detect changes in location or motion patterns, or any combination thereof. In some cases, the distance and angle of arrival of the reflected signals can be used to identify the size, position, movement, and/or orientation of targets (e.g., target 502) in the surrounding environment in order to detect target presence/proximity.

The processor(s) 522 of the wireless device 500 can calculate distances and angles of arrival corresponding to reflected waveforms (e.g., the distance and angle of arrival corresponding to Rx waveform 518) by utilizing signal processing, machine learning algorithms, any other suitable technique, or any combination thereof. In other examples, wireless device 500 can transmit or send the RF sensing data to at least one processor of another computing device, such as a server or base station, that can perform the calculations to obtain the distance and angle of arrival corresponding to Rx waveform 518 or other reflected waveforms.

In one example, the distance of Rx waveform 518 can be calculated by measuring the difference in time from reception of the leakage signal to the reception of the reflected signals. For example, wireless device 500 can determine a baseline distance of zero that is based on the difference from the time the wireless device 500 transmits Tx waveform 516 to the time it receives leakage signal 520 (e.g., propagation delay). The processor(s) 522 of the wireless device 500 can then determine a distance associated with Rx waveform 518 based on the difference from the time the wireless device 500 transmits Tx waveform 516 to the time it receives Rx waveform 518 (e.g., time of flight, which is also referred to as round trip time (RTT)), which can then be adjusted according to the propagation delay associated with leakage signal 520. In doing so, the processor(s) 522 of the wireless device 500 can determine the distance traveled by Rx waveform 518 which can be used to determine the presence and movement of a target (e.g., target 502) that caused the reflection.

In further examples, the angle of arrival of Rx waveform 518 can be calculated by the processor(s) 522 by measuring the time difference of arrival of Rx waveform 518 between individual elements of a receive antenna array, such as antenna 514. In some examples, the time difference of arrival can be calculated by measuring the difference in received phase at each element in the receive antenna array.

In some cases, the distance and the angle of arrival of Rx waveform 518 can be used by processor(s) 522 to determine the distance between wireless device 500 and target 502 as well as the position of the target 502 relative to the wireless device 500. The distance and the angle of arrival of Rx waveform 518 can also be used to determine presence, movement, proximity, identity, or any combination thereof, of target 502. For example, the processor(s) 522 of the wireless device 500 can utilize the calculated distance and angle of arrival corresponding to Rx waveform 518 to determine that the target 502 is moving towards wireless device 500.

As noted above, wireless device 500 can include mobile devices (e.g., IoT devices, smartphones, laptops, tablets, etc.) or other types of devices. In some examples, wireless device 500 can be configured to obtain device location data and device orientation data together with the RF sensing data. In some instances, device location data and device orientation data can be used to determine or adjust the distance and angle of arrival of a reflected signal such as Rx waveform 518. For example, wireless device 500 may be set on a table facing the ceiling as a target 502 (e.g., a user) moves towards it during the RF sensing process. In this instance, wireless device 500 can use its location data and orientation data together with the RF sensing data to determine the direction that the target 502 is moving.

In some examples, device position data can be gathered by wireless device 500 using techniques that include RTT measurements, time of arrival (TOA) measurements, time difference of arrival (TDOA) measurements, passive positioning measurements, angle of arrival (AOA) measurements, angle of departure (AoD) measurements, received signal strength indicator (RSSI) measurements, CSI data, using any other suitable technique, or any combination thereof. In further examples, device orientation data can be obtained from electronic sensors on the wireless device 500, such as a gyroscope, an accelerometer, a compass, a magnetometer, a barometer, any other suitable sensor, or any combination thereof.

Figure 6:
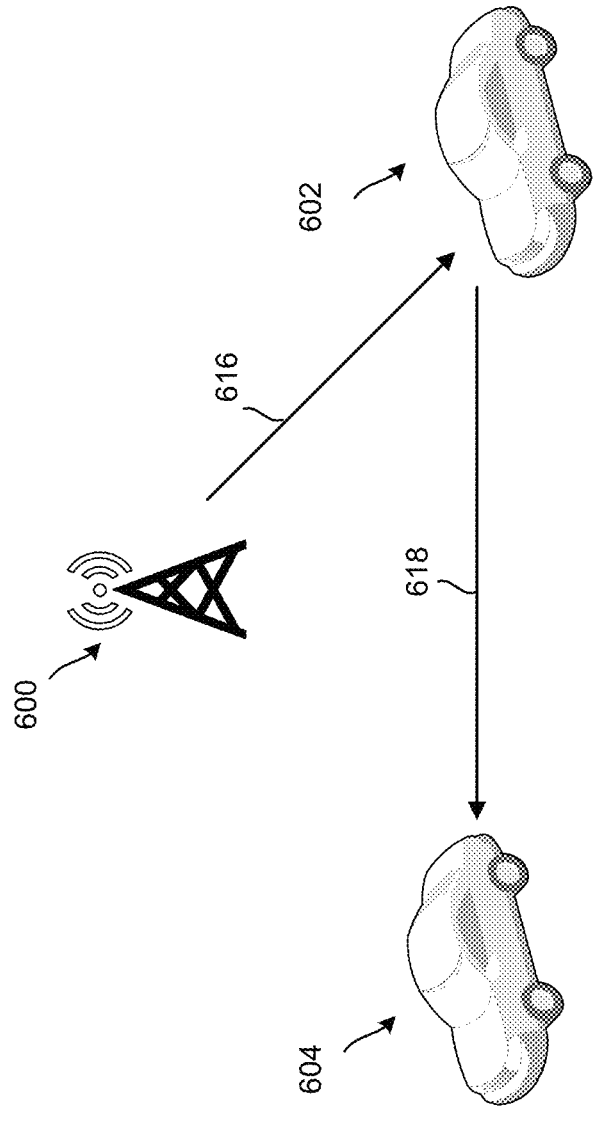
FIG. 6 is a diagram illustrating an example of a receiver utilizing RF bistatic sensing techniques with one transmitter, which may be employed by the disclosed systems and techniques for resource allocation for joint communications and RF sensing, to determine one or more characteristics of a target object, in accordance with some examples.

FIG. 6 is a diagram illustrating an example of a receiver 604 utilizing RF bistatic sensing techniques with one transmitter 600, which may be employed by the disclosed systems and techniques for resource allocation for joint communications and RF sensing, to determine one or more characteristics (e.g., location, speed or velocity, heading, etc.) of a target 602 object, in accordance with some examples. For example, the receiver 604 can use the RF bistatic sensing to detect a presence and location of a target 602 (e.g., an object, user, or vehicle), which is illustrated in the form of a vehicle in FIG. 6. In one example, the receiver 604 can include a vehicle configured to communicate using sidelink communication (e.g., according to cellular vehicle-to-everything (C-V2X) protocols according to 4G/LTE and/or 5G/NR, dedicated short-range communications (DSRC) according to 802.11/WiFi, or other vehicle-based communication protocols).

The bistatic radar system of FIG. 6 includes a transmitter 600 (e.g., a transmit sensing node), which in this figure is depicted to be in the form of a base station, and a receiver 604 (e.g., a receive sensing node) that are separated by a distance comparable to the expected target distance. As compared to the monostatic system of FIG. 5, the transmitter 600 and the receiver 604 of the bistatic radar system of FIG. 6 are located remote from one another. Conversely, monostatic radar is a radar system (e.g., the system of FIG. 5) comprising a transmitter (e.g., the RF transmitter 506 of wireless device 500 of FIG. 5) and a receiver (e.g., the RF receiver 510 of wireless device 500 of FIG. 5) that are co-located with one another.

An advantage of bistatic radar (or more generally, multistatic radar, which has more than one receiver) over monostatic radar is the ability to collect radar returns reflected from a scene at angles different than that of a transmitted pulse. This can be of interest to some applications (e.g., vehicle applications, scenes with multiple objects, military applications, etc.) where targets may reflect the transmitted energy in many directions (e.g., where targets are specifically designed to reflect in many directions), which can minimize the energy that is reflected back to the transmitter. It should be noted that, in one or more examples, a monostatic system can coexist with a multistatic radar system, such as when the transmitter also has a co-located receiver.

In some examples, the transmitter 600 and/or the receiver 604 of FIG. 6 can be a mobile phone, a tablet computer, a wearable device, a vehicle, or other device (e.g., device 407 of FIG. 4) that includes at least one RF interface. In some examples, the transmitter 600 and/or the receiver 604 can be a device that provides connectivity for a user device (e.g., for IoT device 407 of FIG. 4), such as a base station (e.g., a gNB, eNB, etc.), a wireless access point (AP), or other device that includes at least one RF interface.

In some aspects, transmitter 600 can include one or more components for transmitting an RF signal. The transmitter 600 can include at least one processor (e.g., the at least one processor 522 of FIG. 5) that is capable of determining signals (e.g., determining the waveforms for the signals) to be transmitted. The transmitter 600 can also include an RF transmitter (e.g., the RF transmitter 506 of FIG. 5) for transmission of a Tx signal comprising Tx waveform 616. The RF transmitter can be a transmitter configured to transmit cellular or telecommunication signals (e.g., a transmitter configured to transmit 5G/NR signals, 4G/LTE signals, or other cellular/telecommunication signals, etc.), a Wi-Fi transmitter, a Bluetooth™ transmitter, any combination thereof, or any other transmitter capable of transmitting an RF signal.

The RF transmitter can be coupled to one or more transmitting antennas, such as a Tx antenna (e.g., the TX antenna 512 of FIG. 5). In some examples, a Tx antenna can be an omnidirectional antenna that is capable of transmitting an RF signal in all directions, or a directional antenna that transmits an RF signal in a particular direction. In some examples, the Tx antenna may include multiple antennas (e.g., elements) configured as an antenna array.

The receiver 604 can include one or more components for receiving an RF signal. For example, the receiver 604 may include one or more receiving antennas, such as an Rx antenna (e.g., the Rx antenna 514 of FIG. 5). In some examples, an Rx antenna can be an omnidirectional antenna capable of receiving RF signals from multiple directions, or a directional antenna that is configured to receive signals from a particular direction. In further examples, the Rx antenna can include multiple antennas (e.g., elements) configured as an antenna array.

The receiver 604 may also include an RF receiver (e.g., RF receiver 510 of FIG. 5) coupled to the Rx antenna. The RF receiver may include one or more hardware components for receiving an RF waveform such as a Wi-Fi signal, a Bluetooth™ signal, a 5G/NR signal, or any other RF signal. The output of the RF receiver can be coupled to at least one processor (e.g., the at least one processor 522 of FIG. 5). The processor(s) may be configured to process a received waveform (e.g., Rx waveform 618).

In one or more examples, transmitter 600 can implement RF sensing techniques, for example bistatic sensing techniques, by causing a Tx waveform 616 to be transmitted from a Tx antenna. It should be noted that although the Tx waveform 616 is illustrated as a single line, in some cases, the Tx waveform 616 can be transmitted in all directions by an omnidirectional Tx antenna.

In one or more aspects, one or more parameters associated with the Tx waveform 616 may be used to increase or decrease RF sensing resolution. The parameters may include frequency, bandwidth, number of spatial streams, the number of antennas configured to transmit Tx waveform 616, the number of antennas configured to receive a reflected RF signal (e.g., Rx waveform 618) corresponding to the Tx waveform 616, the number of spatial links (e.g., number of spatial streams multiplied by number of antennas configured to receive an RF signal), the sampling rate, or any combination thereof. The transmitted waveform (e.g., Tx waveform 616) and the received waveform (e.g., the Rx waveform 618) can include one or more radar RF sensing signals (also referred to as RF sensing RSs).

During operation, the receiver 604 (e.g., which operates as a receive sensing node) can receive signals that correspond to Tx waveform 616, which is transmitted by the transmitter 600 (e.g., which operates as a transmit sensing node). For example, the receiver 604 can receive signals that are reflected from objects or people that are within range of the Tx waveform 616, such as Rx waveform 618 reflected from target 602. In some cases, the Rx waveform 618 can include multiple sequences that correspond to multiple copies of a sequence that are included in the Tx waveform 616. In some examples, the receiver 604 may combine the multiple sequences that are received to improve the SNR.

In some examples, RF sensing data can be used by at least one processor within the receiver 604 to calculate distances, angles of arrival, or other characteristics that correspond to reflected waveforms, such as the Rx waveform 618. In other examples, RF sensing data can also be used to detect motion, determine location, detect changes in location or motion patterns, or any combination thereof. In some cases, the distance and angle of arrival of the reflected signals can be used to identify the size, position, movement, and/or orientation of targets (e.g., target 602) in the surrounding environment in order to detect target presence/proximity.

The processor(s) of the receiver 604 can calculate distances and angles of arrival corresponding to reflected waveforms (e.g., the distance and angle of arrival corresponding to the Rx waveform 618) by using signal processing, machine learning algorithms, any other suitable technique, or any combination thereof. In other examples, the receiver 604 can transmit or send the RF sensing data to at least one processor of another computing device, such as a server, that can perform the calculations to obtain the distance and angle of arrival corresponding to the Rx waveform 618 or other reflected waveforms.

In one or more examples, the angle of arrival of the Rx waveform 618 can be calculated by a processor(s) of the receiver 604 by measuring the time difference of arrival of the Rx waveform 618 between individual elements of a receive antenna array of the receiver 604. In some examples, the time difference of arrival can be calculated by measuring the difference in received phase at each element in the receive antenna array.

In some cases, the distance and the angle of arrival of the Rx waveform 618 can be used by the processor(s) of the receiver 604 to determine the distance between the receiver 604 and the target 602 as well as the position of target 602 relative to the receiver 604. The distance and the angle of arrival of the Rx waveform 618 can also be used to determine presence, movement, proximity, identity, or any combination thereof, of the target 602. For example, the processor(s) of the receiver 604 may use the calculated distance and angle of arrival corresponding to the Rx waveform 618 to determine that the target 602 is moving towards the receiver 604.

Figure 7:
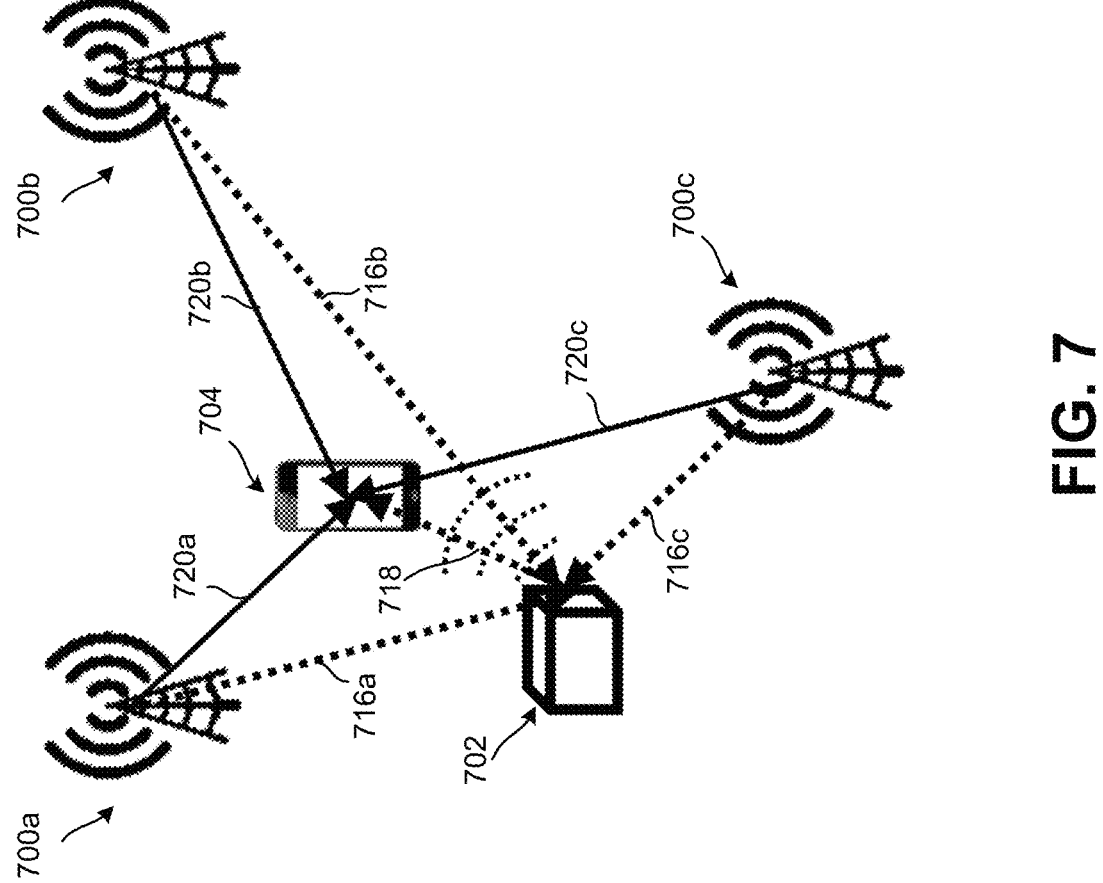
FIG. 7 is a diagram illustrating an example of a receiver utilizing RF bistatic sensing techniques with multiple transmitters, which may be employed by the disclosed systems and techniques for resource allocation for joint communications and RF sensing, to determine one or more characteristics of a target object, in accordance with some examples.

FIG. 7 is a diagram illustrating an example of a receiver 704, in the form of a smart phone, utilizing RF bistatic sensing techniques with multiple transmitters (including a transmitter 700a, a transmitter 700b, and a transmitter 700c), which may be employed by the disclosed systems and techniques for resource allocation for joint communications and RF sensing, to determine one or more characteristics (e.g., location, velocity or speed, heading, etc.) of a target 702 object, in accordance with some examples. For example, the receiver 704 may use RF bistatic sensing to detect a presence and location of a target 702 (e.g., an object, user, or vehicle). The target 702 is depicted in FIG. 7 in the form of an object that does not have communications capabilities (which can be referred to as a device-free object), such as a person, a vehicle (e.g., a vehicle without the ability to transmit and receive messages, such as using C-V2X or DSRC protocols), or other device-free object. The bistatic radar system of FIG. 7 is similar to the bistatic radar system of FIG. 6, except that the bistatic radar system of FIG. 7 has multiple transmitters 700a, 700b, 700c, while the bistatic radar system of FIG. 6 has only one transmitter 600.

The bistatic radar system of FIG. 7 includes multiple transmitters 700a, 700b, 700c (e.g., transmit sensing nodes), which are illustrated to be in the form of base stations. The bistatic radar system of FIG. 7 also includes a receiver 704 (e.g., a receive sensing node), which is depicted in the form of a smart phone. The each of the transmitters 700a, 700b, 700c is separated from the receiver 704 by a distance comparable to the expected distance from the target 702. Similar to the bistatic system of FIG. 6, the transmitters 700a, 700b, 700c and the receiver 704 of the bistatic radar system of FIG. 7 are located remote from one another.

In one or more examples, the transmitters 700a, 700b, 700c and/or the receiver 704 may each be a mobile phone, a tablet computer, a wearable device, a vehicle (e.g., a vehicle configured to transmit and receive communications according to C-V2X, DSRC, or other communication protocol), or other device (e.g., device 407 of FIG. 4) that includes at least one RF interface. In some examples, the transmitters 700a, 700b, 700c and/or the receiver 704 may each be a device that provides connectivity for a user device (e.g., for IoT device 407 of FIG. 4), such as a base station (e.g., a gNB, eNB, etc.), a wireless access point (AP), or other device that includes at least one RF interface.

The transmitters 700a, 700b, 700c may include one or more components for transmitting an RF signal. Each of the transmitters 700a, 700b, 700c may include at least one processor (e.g., the processor(s) 522 of FIG. 5) that is capable of determining signals (e.g., determining the waveforms for the signals) to be transmitted. Each of the transmitters 700a, 700b, 700c can also include an RF transmitter (e.g., the RF transmitter 506 of FIG. 5) for transmission of Tx signals comprising Tx waveforms 716a, 716b, 716c, 720a, 720b, 720c. In one or more examples, Tx waveforms 716a, 716b, 716c are RF sensing signals, and Tx waveforms 720a, 720b, 720c are communications signals. In one or more examples, the Tx waveforms 720a, 720b, 720c are communications signals that may be used for scheduling transmitters (e.g., transmitters 700a, 700b, 700c) and receivers (e.g., receiver 704) for performing RF sensing of a target (e.g., target 702) to obtain location information regarding the target. The RF transmitter can be a transmitter configured to transmit cellular or telecommunication signals (e.g., a transmitter configured to transmit 5G/NR signals, 4G/LTE signals, or other cellular/telecommunication signals, etc.), a Wi-Fi transmitter, a Bluetooth™ transmitter, any combination thereof, or any other transmitter capable of transmitting an RF signal.

The RF transmitter may be coupled to one or more transmitting antennas, such as a Tx antenna (e.g., the TX antenna 512 of FIG. 5). In one or more examples, a Tx antenna can be an omnidirectional antenna that is capable of transmitting an RF signal in all directions, or a directional antenna that transmits an RF signal in a particular direction. The Tx antenna may include multiple antennas (e.g., elements) configured as an antenna array.

The receiver 704 of FIG. 7 may include one or more components for receiving an RF signal. For example, the receiver 704 can include one or more receiving antennas, such as an Rx antenna (e.g., the Rx antenna 514 of FIG. 5). In one or more examples, an Rx antenna can be an omni-directional antenna capable of receiving RF signals from multiple directions, or a directional antenna that is configured to receive signals from a particular direction. In some examples, the Rx antenna may include multiple antennas (e.g., elements) configured as an antenna array.

The receiver 704 can also include an RF receiver (e.g., RF receiver 510 of FIG. 5) coupled to the Rx antenna. The RF receiver may include one or more hardware components for receiving an RF waveform such as a Wi-Fi signal, a Bluetooth™ signal, a 5G/NR signal, or any other RF signal. The output of the RF receiver can be coupled to at least one processor (e.g., the processor(s) 522 of FIG. 5). The processor(s) may be configured to process a received waveform (e.g., Rx waveform 718, which is a reflection (echo) RF sensing signal).

In some examples, the transmitters 700a, 700b, 700c can implement RF sensing techniques, for example bistatic sensing techniques, by causing Tx waveforms 716a, 716b, 716c (e.g., radar sensing signals) to be transmitted from a Tx antenna associated with each of the transmitters 700a, 700b, 700c. Although the Tx waveforms 716a, 716b, 716c are illustrated as single lines, in some cases, the Tx waveforms 716a, 716b, 716c may be transmitted in all directions (e.g., by an omnidirectional Tx antenna associated with each of the transmitters 700a, 700b, 700c).

In one or more aspects, one or more parameters associated with the Tx waveforms 716a, 716b, 716c may be used to increase or decrease RF sensing resolution. The parameters can include, but are not limited to, frequency, bandwidth, number of spatial streams, the number of antennas configured to transmit Tx waveforms 716a, 716b, 716c, the number of antennas configured to receive a reflected (echo) RF signal (e.g., Rx waveform 718) corresponding to each of the Tx waveforms 716a, 716b, 716c, the number of spatial links (e.g., number of spatial streams multiplied by number of antennas configured to receive an RF signal), the sampling rate, or any combination thereof. The transmitted waveforms (e.g., Tx waveforms 716a, 716b, 716c) and the received waveforms (e.g., the Rx waveform 718) may include one or more radar RF sensing signals (also referred to as RF sensing RSs). It should be noted that although only one reflected sensing signal (e.g., Rx waveform 718) is shown in FIG. 7, it is understood that a separate reflection (echo) sensing signal will be generated by each sensing signal (e.g., Tx waveforms 716a, 716b, 716c) reflecting off of the target 702.

During operation of the system of FIG. 7, the receiver 704 (e.g., which operates as a receive sensing node) can receive signals that correspond to Tx waveforms 716a, 716b, 716c, which are transmitted by the transmitters 700a, 700b, 700c

(e.g., which each operate as a transmit sensing node). The receiver 704 can receive signals that are reflected from objects or people that are within range of the Tx waveforms 716a, 716b, 716c, such as Rx waveform 718 reflected from the target 702. In one or more examples, the Rx waveform 718 may include multiple sequences that correspond to multiple copies of a sequence that are included in its corresponding Tx waveform 716a, 716b, 716c. In some examples, the receiver 704 may combine the multiple sequences that are received to improve the SNR.

In some examples, RF sensing data can be used by at least one processor within the receiver 704 to calculate distances, angles of arrival (AOA), TDOA, angle of departure (AoD), or other characteristics that correspond to reflected waveforms (e.g., Rx waveform 718). In further examples, RF sensing data can also be used to detect motion, determine location, detect changes in location or motion patterns, or any combination thereof. In one or more examples, the distance and angle of arrival of the reflected signals can be used to identify the size, position, movement, and/or orientation of targets (e.g., target 702) in order to detect target presence/proximity.

The processor(s) of the receiver 704 can calculate distances and angles of arrival corresponding to reflected waveforms (e.g., the distance and angle of arrival corresponding to the Rx waveform 718) by using signal processing, machine learning algorithms, any other suitable technique, or any combination thereof. In one or more examples, the receiver 704 can transmit or send the RF sensing data to at least one processor of another computing device, such as a server, that can perform the calculations to obtain the distance and angle of arrival corresponding to the Rx waveform 718 or other reflected waveforms (not shown).

In one or more examples, a processor(s) of the receiver 704 can calculate the angle of arrival (AOA) of the Rx waveform 718 by measuring the TDOA of the Rx waveform 718 between individual elements of a receive antenna array of the receiver 704. In some examples, the TDOA can be calculated by measuring the difference in received phase at each element in the receive antenna array. In one illustrative example, to determine TDOA, the processor(s) can determine the difference time of arrival of the Rx waveform 718 to the receive antenna array elements, using one of them as a reference. The time difference is proportional to distance differences.

In some cases, the processor(s) of the receiver 704 can use the distance, the AOA, the TDOA, other measured information (e.g., AoD, etc.), any combination thereof, of the Rx waveform 718 to determine the distance between the receiver 704 and the target 702, and determine the position of target 702 relative to the receiver 704. In one example, the processor(s) can apply a multilateration or other location-based algorithm using the distance, AOA, and/or TDOA information as input to determine a position (e.g., 3D position) of the target 702. In other examples, the processor(s) can use the distance, the AOA, and/or the TDOA of the Rx waveform 718 to determine a presence, movement (e.g., velocity or speed, heading or direction or movement, etc.), proximity, identity, any combination thereof, or other characteristic of the target 702. For instance, the processor(s) of the receiver 704 may use the distance, the AOA, and/or the TDOA corresponding to the Rx waveform 718 to determine that the target is moving towards the receiver 704.

Figure 8:
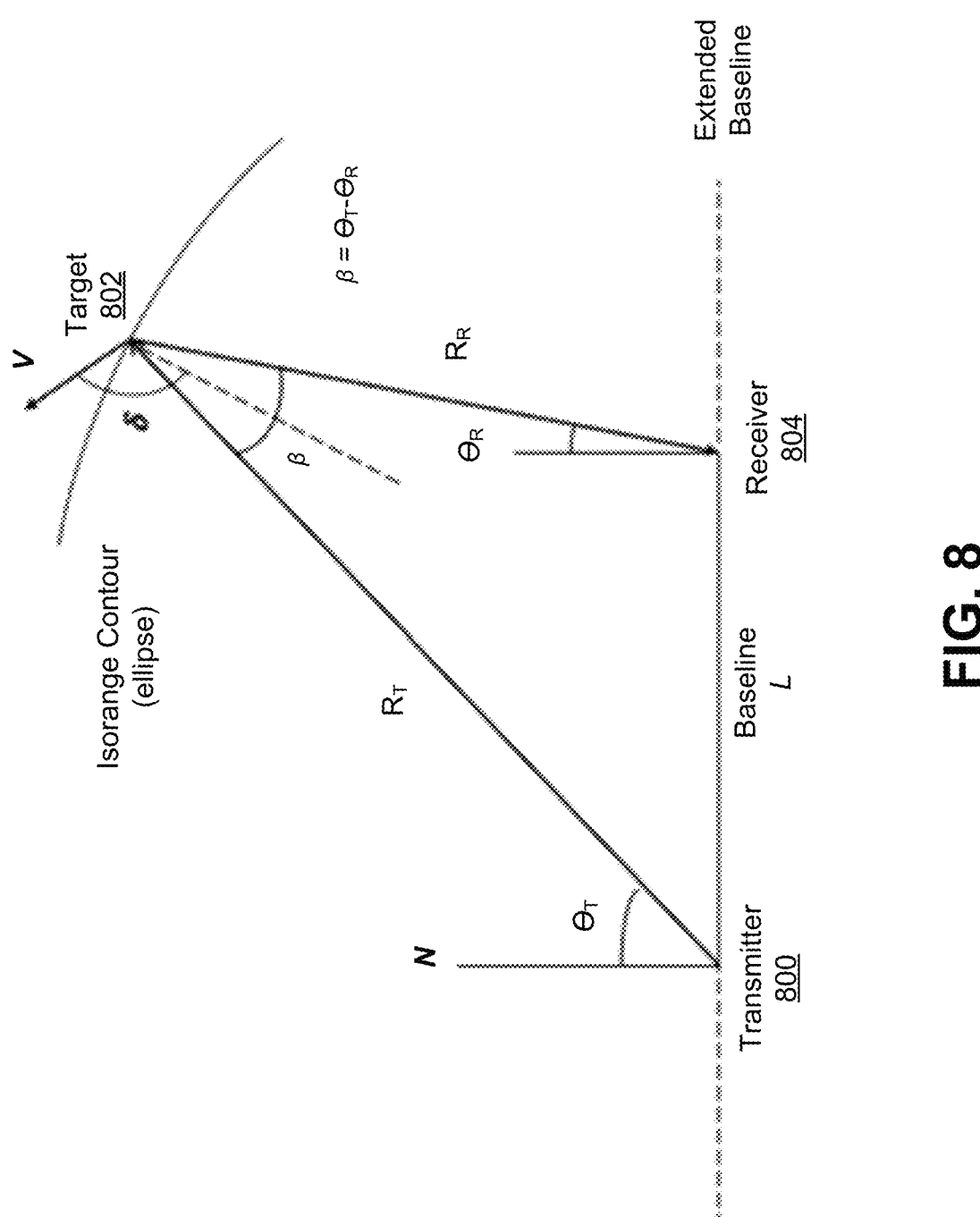
FIG. 8 is a diagram illustrating an example geometry for bistatic (or monostatic) sensing, in accordance with some examples.

FIG. 8 is a diagram illustrating geometry for bistatic (or monostatic) sensing, in accordance with some examples. FIG. 8 shows a bistatic radar North-reference coordinate system in two-dimensions. In particular, FIG. 8 shows a coordinate system and parameters defining bistatic radar operation in a plane (referred to as a bistatic plane) containing a transmitter 800, a receiver 804, and a target 802. A bistatic triangle lies in the bistatic plane. The transmitter 800, the target 802, and the receiver 804 are shown in relation to one another. The transmitter 800 and the receiver 804 are separated by a baseline distance L. The extended baseline is defined as continuing the baseline distance L beyond either the transmitter 800 or the receiver 804. The target 802 and the transmitter 800 are separated by a distance $R_T$, and the target 802 and the receiver 804 are separated by a distance $R_R$.

Angles $\theta_T$ and $\theta_R$ are, respectively, the transmitter 800 and receiver 804 look angles, which are taken as positive when measured clockwise from North (N). The angles $\theta_T$ and $\theta_R$ are also referred to as angles of arrival (AOA) or lines of sight (LOS). A bistatic angle ($\beta$) is the angle subtended between the transmitter 800, the target 802, and the receiver 804 in the radar. In particular, the bistatic angle is the angle between the transmitter 800 and the receiver 804 with the vertex located at the target 802. The bistatic angle is equal to the transmitter 800 look angle minus the receiver 804 look angle $\theta_R$ (e.g., $\beta=\theta_T-\theta_R$).

When the bistatic angle is exactly zero (0), the radar is considered to be a monostatic radar; when the bistatic angle is close to zero, the radar is considered to be pseudo-monostatic; and when the bistatic angle is close to 180 degrees, the radar is considered to be a forward scatter radar. Otherwise, the radar is simply considered to be, and referred to as, a bistatic radar. The bistatic angle ($\beta$) can be used in determining the radar cross section of the target.

Figure 9:
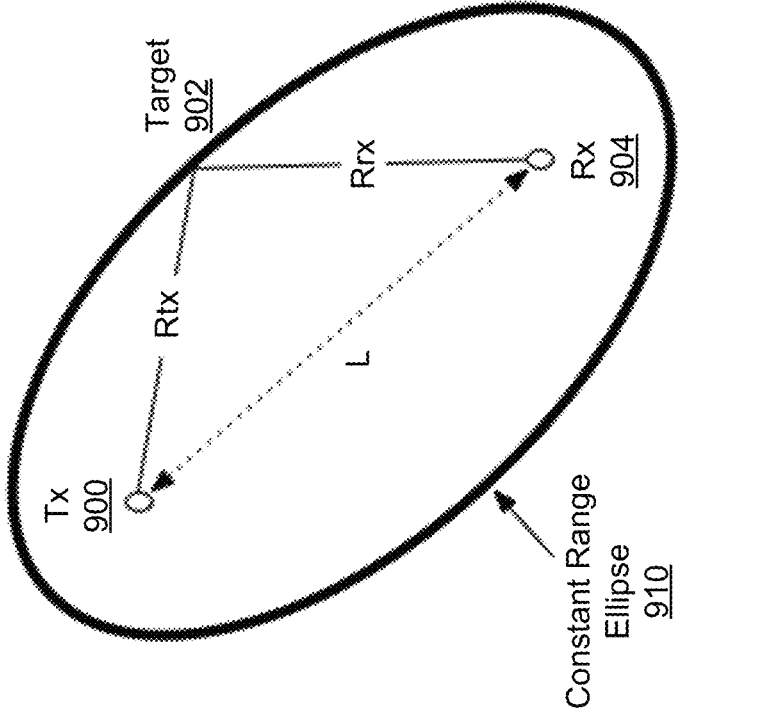
FIG. 9 is a diagram illustrating a bistatic range of bistatic sensing, in accordance with some examples.

FIG. 9 is a diagram illustrating an example of a bistatic range 910 of bistatic sensing, in accordance with some examples. In this figure, a transmitter (Tx) 900, a target 902, and a receiver (Rx) 904 of a radar are shown in relation to one another. The transmitter 900 and the receiver 904 are separated by a baseline distance L, the target 902 and the transmitter 900 are separated by a distance Rtx, and the target 902 and the receiver 904 are separated by a distance Rrx.

Bistatic range 910 (shown as an ellipse) refers to the measurement range made by radar with a separate transmitter 900 and receiver 904 (e.g., the transmitter 900 and the receiver 904 are located remote from one another). The receiver 904 measures the time of arrival from when the signal is transmitted by the transmitter 900 to when the signal is received by the receiver 904 from the transmitter 900 via the target 902. The bistatic range 910 defines an ellipse of constant bistatic range, referred to an iso-range contour, on which the target 902 lies, with foci centered on the transmitter 900 and the receiver 904. If the target 902 is at range Rrx from the receiver 904 and range Rtx from the transmitter 900, and the receiver 904 and the transmitter 900 are located a distance L apart from one another, then the bistatic range is equal to Rrx+Rtx−L. It should be noted that motion of the target 902 causes a rate of change of bistatic range, which results in bistatic Doppler shift.

Generally, constant bistatic range points draw an ellipsoid, with the transmitter 900 and the receiver 904 positions as the focal points. The bistatic iso-range contours are where the ground slices the ellipsoid. When the ground is flat, this intercept forms an ellipse (e.g., bistatic range 910). Note that except when the two platforms have equal altitude, these ellipses are not centered on a specular point.

Figure 10:
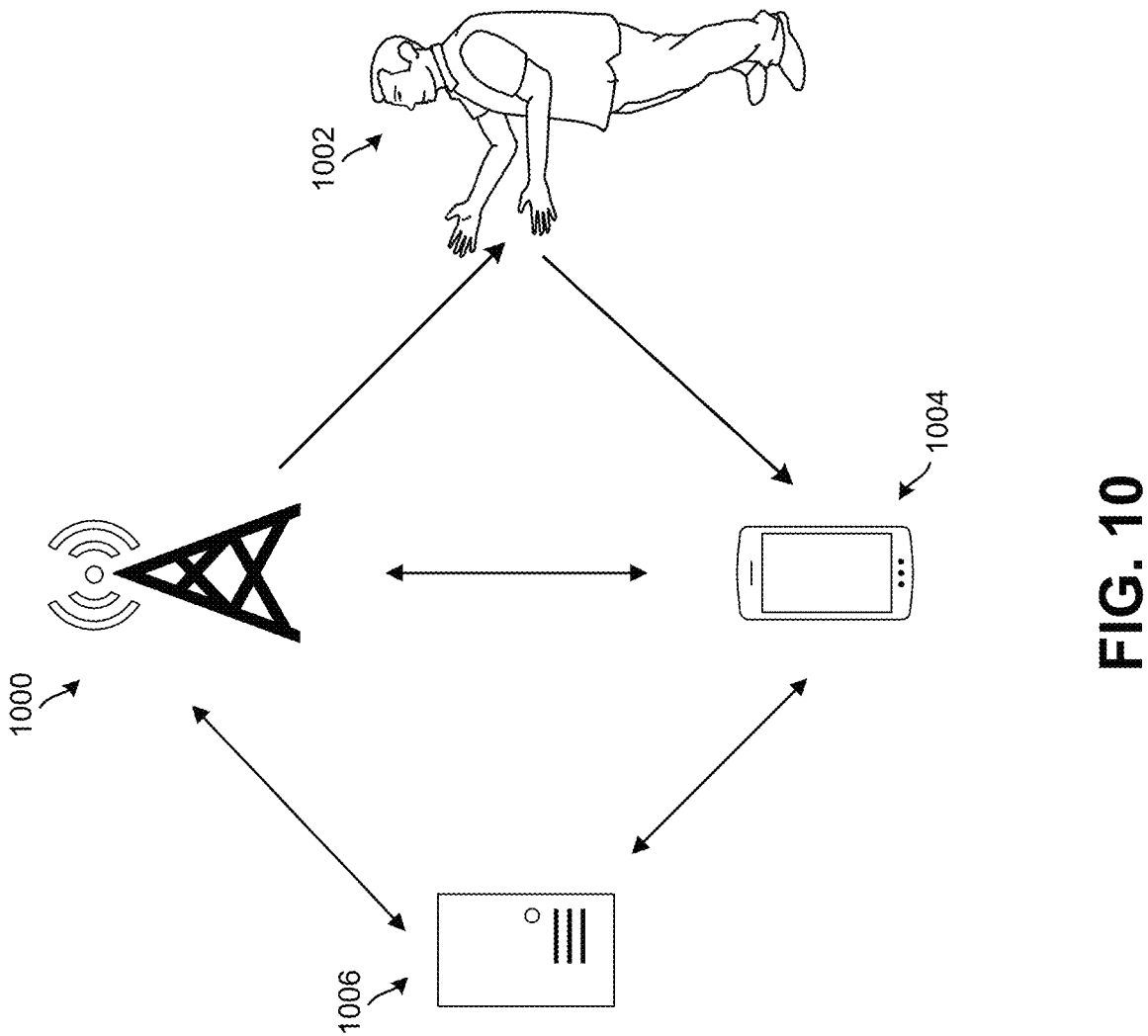
FIG. 10 is a diagram illustrating an example of a system for resource allocation for joint communications and RF sensing, in accordance with some examples.

FIG. 10 is a diagram illustrating an example of a system for resource allocation for joint communications and RF sensing, in accordance with some examples. In FIG. 10, a radar receiver 1004 communicates with a network entity 1006 regarding an allocation of resources for communications purposes. The system of FIG. 10 is shown to include the radar receiver 1004 in the form of a UE (e.g., a mobile device such as a smartphone), a radar transmitter 1000 in the form of a network entity (e.g., a radar server, a location management function (LMF), or a base station, such as an eNB or gNB), a target 1002 (e.g., a device-free object, such as a person), and the network entity 1006. It should be noted that, in one or more examples, the radar transmitter 1000 and/or the radar receiver 1004 may be in the form of a UE, a location server (e.g., a location management function (LMF), a base station (e.g., eNB or gNB), or other electronic device capable of transmitting and/or receiving RF sensing signals (e.g., radar RSs). In some aspects, the network entity 1006 may include or be implemented as a radar server configured to coordinate and/or schedule RF sensing resources and/or functions for other devices (e.g., for radar receiver 1004, radar transmitter 1000, etc.), a location server (e.g., an LMF), a base station (e.g., an eNB or gNB), or other network entity. In these aspects, the network entity 1006 and/or other network entity of FIG. 10 (e.g., the radar transmitter 1000) can be implemented in an aggregated or monolithic architecture (e.g., an aggregated or monolithic base station or server architecture), or alternatively, in a disaggregated architecture (e.g., a disaggregated base station or server architecture), and may include one or more of a central unit (CU), a distributed unit (DU), a radio unit (RU), a Near-Real Time (Near-RT) RAN Intelligent Controller (RIC), or a Non-Real Time (Non-RT) RIC.

The radar receiver 1004 and the radar transmitter 1000 may perform RF sensing (e.g., monostatic, bistatic, and/or multistatic sensing) of the target 1002 to obtain RF sensing measurements (e.g., RTT, TOA, and/or TDOA measurements) of the target 1002. It should be noted that, in one or more examples, the system may include more than one radar receiver 1004 (e.g., for performing bistatic or other multistatic sensing), more than one radar transmitter 1000 (e.g., for performing bistatic or other multistatic sensing), more than one network entity 1006, and/or more than one target 1002. In some examples, at least one radar transmitter 1000 may be co-located with a radar receiver 1004 for performing monostatic sensing.

The RF sensing measurements of the target 1002 can be used (e.g., by at least one processor(s) of the radar receiver 1004 and/or the network entity 1006) to determine one or more characteristics (e.g., location, distance, movement, heading, size, and/or other characteristics) of the target 1002. The characteristics of the target 1002 are indicative of the sensing environment of the radar receiver 1004, and can be used (e.g., by at least one processor(s) of the radar receiver 1004 and/or the network entity 1006) to determine the sensing measurement accuracy of the radar receiver 1004. It should be noted, in one or more examples, additional measurements (e.g., light detection and ranging (LI-DAR) measurements, ultrasound measurements, and/or positioning measurements) may also be used to determine the sensing measurement accuracy of the radar receiver 1004.

The system of FIG. 10 may perform radar reference signal (RS)-based sensing, in which the radar receiver 1004 may determine the characteristics of the target 1002 and determine the sensing measurement accuracy for the radar receiver 1004. Alternatively, the system of FIG. 10 may perform network-based sensing, in which the network entity 1006 (e.g., a radar server) may determine the characteristics of the target 1002 and determine the sensing measurement accuracy for the radar receiver 1004.

During operation of the system for radar RS-based sensing, for example when performing bistatic sensing of the target 1002, the radar transmitter 1000 may transmit RF sensing signals (e.g., radar RSs) towards the target 1002. The RF sensing signals reflect off of the target 1002 to produce RF reflection sensing signals. The radar receiver 1004 can receive the RF reflection sensing signals. At least one processor (e.g., processor 522 of FIG. 5) of the radar receiver 1004 may then determine or compute the characteristics (e.g., location, distance, movement, heading, size, etc.) of the target 1002 by using RF sensing measurements from the received RF reflection sensing signals. As previously noted, the characteristics of the target 1002 are indicative of the sensing environment related to the radar receiver 1004. It should be noted that the sensing environment is unknown before the scheduling of the transmission by the radar transmitter 1000 of the RF sensing signals.

At least one processor (e.g., processor 522 of FIG. 5) of the radar receiver 1004 may also determine (compute) performance metrics (e.g., operating range, maximum range, and/or range/Doppler accuracy) for the radar receiver 1004 by using the RF sensing measurements from the received RF reflection sensing signals. It should be noted that, regarding the performance metrics, the maximum range may be related to the SNR of the RF sensing signals, the range may be related to the bandwidth of the RF sensing signals, and the Doppler resolution may be related to time/distance between two separate RF sensing signals.

After determining the one or more characteristics of the target 1002 and the performance metrics for the radar receiver 1004, at least one processor (e.g., processor 522 of FIG. 5) of the radar receiver 1004 may determine or compute the sensing measurement accuracy for the radar receiver 1004 by using the determined characteristics of the target 1002 and the performance metrics for the radar receiver 1004. Based on the sensing measurement accuracy for the radar receiver 1004 and/or the characteristics of the target 1002, at least one processor (e.g., processor 522 of FIG. 5) of the radar receiver 1004 or the network entity 1006 (e.g., the radar server) may then determine whether any of the RF sensing resources (e.g., radar RSs) allocated to the radar receiver 1004 can be allocated (and, if so, which specific resources can be allocated) for communications purposes, while maintaining acceptable sensing measurement accuracy.

For instance, based on the determination of the allocation of sensing resources, the radar receiver 1004 may make one or more recommendation (e.g., by signaling one or more messages to the network entity 1006 and/or the radar transmitter 1000) regarding the allocation of some of its RF sensing resources (e.g., radar RSs) for communication purposes. In some aspects, the radar receiver 1004 may explicitly signal one or more messages with a specific type of recommendation to the network entity 1006 and/or the radar transmitter 1000. In some cases, the radar receiver 1004 may determine the specific type of recommendation based on current or recent RF sensing results related to the target 1002 (e.g., based on determining the target 1002 is static or not moving, determining the target 1002 is moving slowly, recently determining a characteristic of the target 1002 such as a size or Doppler range of the target 1002, etc.).

In one illustrative example, the radar receiver 1004 may explicitly signal one or more messages to the network entity 1006 and/or the radar transmitter 1000 with information (e.g., one or more information elements (IEs) or fields)

recommending cancellation of the transmission, by the radar transmitter 1000, of scheduled periodical RF sensing signals. For instance, the radar receiver 1004 may recommend canceling the transmission of periodic RF sensing signals if the radar receiver 1004 determines that the target 1002 is static (not moving), such as based on the performing of one or more RF sensing techniques (e.g., monostatic sensing, bistatic sensing, or multistatic sensing). In such an example, because the characteristics (e.g., location, distance, movement, heading, size, etc.) of the target 1002 may not change if the target 1002 is not moving, the RF sensing signals may not be needed to determine the characteristics. In some aspects, the signaling may recommend canceling the transmission for at least a period of time (e.g., for the 30 seconds, the next minute, the two minutes, the next five minutes, or other period of time).

In another example, the radar receiver 1004 may explicitly signal one or more messages to the network entity 1006 and/or the radar transmitter 1000 with information (e.g., one or more IEs or fields) recommending reduction of the periodicity or frequency in which the scheduled periodical RF sensing signals are transmitted to the radar receiver 1004. For instance, the radar receiver 1004 may recommend reducing the periodicity or frequency of the RF sensing signals if the radar receiver 1004 determines that the target 1002 is moving very slowly (e.g., below a speed threshold, such as 8 kilometers per hour (kph)). In such an example, the amount of RF sensing signals needed by the radar receiver 1004 may be less because RF sensing operations may need to be performed less frequently to determine characteristics of the target 1002 when the target 1002 is moving slowly. In some aspects, the signaling may recommend reducing the frequency bandwidth allocation for at least a period of time (e.g., for the 30 seconds, the next minute, the two minutes, the next five minutes, or other period of time).

In another illustrative example, the radar receiver 1004 may explicitly signal one or more messages to the network entity 1006 and/or the radar transmitter 1000 with information (e.g., one or more IEs or fields) recommending reduction of the bandwidth and/or time duration of the scheduled periodical RF sensing signals. For instance, the radar receiver 1004 may recommend reducing the bandwidth and/or time duration of the scheduled periodical RF sensing signal if the radar receiver 1004 has already determined a particular characteristic of the target 1002 (e.g., a size, Doppler range, etc.). In some aspects, the signaling may recommend reducing the bandwidth and/or time duration for at least a period of time (e.g., for the 30 seconds, the next minute, the two minutes, the next five minutes, or other period of time).

In yet another illustrative example, the radar receiver 1004 may recommend increasing the period of transmission of the scheduled periodical RF sensing signals and/or decreasing the number of antenna beams for each radar RS resource set for the scheduled periodical RF sensing signals. In some aspects, the signaling may recommend increasing the period of transmission for at least a period of time (e.g., for the 30 seconds, the next minute, the two minutes, the next five minutes, or other period of time).

In some aspects, the radar receiver 1004 may transmit the resource allocation recommendations within a message to the network entity 1006 (e.g., radar server) and/or radar transmitter 1000. In some cases, the message may also comprise the RF sensing measurements from the received RF reflection sensing signals. In one or more examples, the message may be transmitted by the radar receiver 1004 to the network entity 1006 via the radar transmitter 1000. In some aspects, the message may be transmitted utilizing LTE positioning protocol (LPP), NR positioning protocol A (NRPPa), a radio resource control (RRC) protocol, downlink control information (DCI), or a medium access control-control element (MAC-CE), or other protocol or messaging. As noted above, the radar receiver 1004 may be a UE or network entity (e.g., a base station such as an eNB or gNB). In some examples, the message with the recommended change in RF sensing resource allocation may be transmitted by the network entity 1006 (e.g., the radar server), such as in network-based RF sensing scenarios when all the RF sensing results would be reported to the radar server. In some aspects, the message may be requested by the network (e.g., by the network entity 1006 which can be a location server or the radar transmitter 1000 which can be a base station). For example, if the communication is overloaded (e.g., there are not enough communications resources to performing voice or data communications), the network entity 1006, radar transmitter 1000, or other network entity may send one or more messages requesting the network entity 1006 (e.g., radar server) or the radar receiver 1004 if it is possible to free up any RF sensing resource for communications. For example, if the radar transmitter 1000 or other network entity sends a resource allocation request to the network entity 1006 (e.g., radar server), the network entity 1006 can inquire the radar receiver 1004 for any available RF sensing resources that can be re-allocated.

Once the network entity 1006 receives the message from the radar receiver 1004 with the recommended change in RF sensing resource allocation, the network entity 1006 may determine a specific allocation of resources for the radar receiver 1004 (and/or the radar transmitter 1000) to be used for communications purposes, such as based on the resource allocation recommendations from the radar receiver 1004 and the RF sensing measurements from the received RF reflection sensing signals. After the network entity 1006 determines the specific allocation of resources for the radar receiver 1004 (and/or the radar transmitter 1000) to be used for communications purposes, the network entity 1006 may transmit resource allocation signaling to the radar receiver 1004 (and/or the radar transmitter 1000). The resource allocation signaling indicates to the radar receiver 1004 (and/or the radar transmitter 1000) specific resources that are allocated for communications purposes for the radar receiver 1004 (and/or radar transmitter 1000).

In some examples, the network entity 1006 (e.g., radar server) can determine whether resources allocated to the radar receiver 1004 can be re-allocated for communications purposes, such as in a network-based RF sensing. For example, during operation of the system for network-based RF sensing, for example when performing bistatic sensing of the target 1002, the radar transmitter 1000 may transmit RF sensing signals towards the target 1002, and the RF sensing signals can reflect off of the target 1002 to produce RF reflection sensing signals. The radar receiver 1004 can receive the RF reflection sensing signals.

The radar receiver 1004 may then transmit RF sensing measurements from the received RF reflection sensing signals within a message (with a recommending change to RF sensing resource allocation) to the network entity 1006 (e.g., radar server). In some examples, the message may be transmitted by the radar receiver 1004 to the network entity 1006 via the radar transmitter 1000. In one or more examples, the message may be transmitted utilizing LPP, NRPPa, a radio resource control (RRC) protocol, downlink control information (DCI), or a medium access control-control element (MAC-CE), or other protocol or messaging.

Once the network entity 1006 (e.g., radar receiver) receives the message from the radar receiver 1004, at least one processor (e.g., processor 522 of FIG. 5) of the network entity 1006 may determine or compute one or more characteristics (e.g., location, distance, movement, heading, size, and/or other characteristics) of the target 1002 by using RF sensing measurements from the received RF reflection sensing signals. At least one processor (e.g., processor 522 of FIG. 5) of the network entity 1006 may also determine (compute) performance metrics (e.g., operating range, maximum range, and/or range/Doppler accuracy) for the radar receiver 1004 by using the RF sensing measurements from the received RF reflection sensing signals.

After determining the characteristics of the target 1002 and the performance metrics for the radar receiver 1004, at least one processor (e.g., processor 522 of FIG. 5) of the network entity 1006 may determine (compute) the sensing measurement accuracy for the radar receiver 1004 by using the determined characteristics of the target 1002 and the performance metrics for the radar receiver 1004. At least one processor (e.g., processor 522 of FIG. 5) of the network entity 1006 may then determine (compute), based on the sensing measurement accuracy for the radar receiver 1004 and/or the characteristics of the target 1002, whether any of the sensing resources allocated to the radar receiver 1004 can be re-allocated (and, if so, which specific resources) for communications purposes, while maintaining acceptable sensing measurement accuracy.

The network entity 1006 may then determine a specific allocation of resources from the radar receiver 1004 (and/or the radar transmitter 1000) to be used for communications purposes, based on the sensing measurement accuracy for the radar receiver 1004 and/or the characteristics of the target 1002. For example, similar to that described above, if the network entity 1006 determines that the target 1002 is static (not moving), the network entity 1006 may determine to cancel the transmission, by the radar transmitter 1000, of scheduled periodical RF sensing signals. In another example, if the network entity 1006 determines that the target 1002 is moving slowly, the network entity 1006 may determine to reduce the frequency at which the scheduled periodical RF sensing signals are transmitted to the radar receiver 1004. In yet another example, if the network entity 1006 has already determined one or more particular characteristics (e.g., the size, Doppler range, etc.) of the target 1002, the network entity 1006 may determine to reduce the bandwidth and/or time duration of the scheduled periodical RF sensing signals. In addition, for example, the network entity 1006 may determine to increase the period of transmission of the scheduled periodical RF sensing signals and/or to decrease the number of antenna beams for each radar RS resource set for the scheduled periodical RF sensing signals.

After the network entity 1006 determines the specific allocation of resources from the radar receiver 1004 (and/or the radar transmitter 1000) to be used for communications purposes, the network entity 1006 may transmit, to the radar receiver 1004 (and/or the radar transmitter 1000), resource allocation signaling indicating the specific resources of the radar receiver 1004 (and/or radar transmitter 1000) to be allocated for communications purposes.

The description of FIG. 10 provides an illustrative example of the resource allocation signaling transmitted from the network entity 1006 (e.g., radar server). It should be noted that, in one or more examples, the network entity 1006 may determine to allocate, for communications purposes, resources from the radar receiver 1004 (and/or the radar transmitter 1000) other than sensing resources, such as positioning resources (e.g., which may utilize positioning reference signals (PRSs)).

Figure 11:
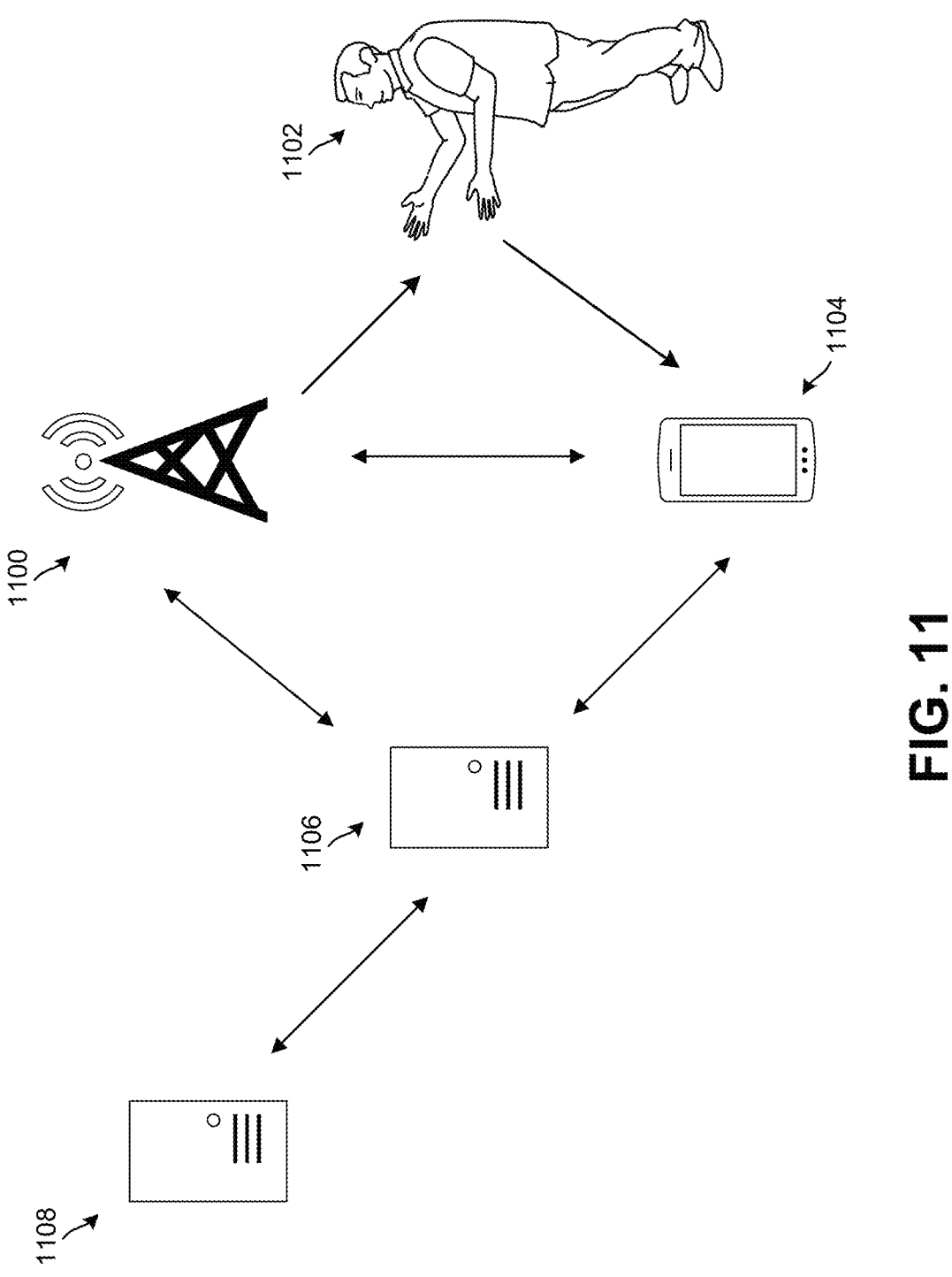
FIG. 11 is a diagram illustrating another example of a system for resource allocation for joint communications and RF sensing, in accordance with some examples.

FIG. 11 is a diagram illustrating an example of a system for resource allocation for joint communications and RF sensing, in accordance with some examples. In FIG. 11, a first network entity (e.g., a radar server) 1106 communicates with a second network entity (e.g., a network server) 1108 regarding an allocation of resources for communications purposes. The system of FIG. 11 is shown to include the radar receiver 1104, which is in the form of a UE (e.g., a mobile device such as a smartphone); a radar transmitter 1100, which is in the form of a network entity (e.g., a location management function (LMF) or a base station, such as an eNB or gNB); a target 1102 (e.g., a device-free object, such as a person); the first network entity 1106 (e.g., a radar server); and the second network entity 1108 (e.g., network server). It should be noted that, in one or more examples, the radar transmitter 1100 and/or the radar receiver 1104 may be in the form of a UE, an LMF, a base station (e.g., eNB or gNB), or other similar electronic device capable of transmitting and/or receiving RF sensing signals (e.g., radar RSs). In addition, the first network entity 1106 and/or the second network entity 1108 may be in the form of an LMF, a server, or a base station (e.g., eNB or gNB). In some cases, the first network entity 1106 and/or the second network entity 1108 can be implemented in an aggregated or monolithic architecture (e.g., an aggregated or monolithic base station or server architecture), or alternatively, in a disaggregated architecture (e.g., a disaggregated base station or server architecture), and may include one or more of a central unit (CU), a distributed unit (DU), a radio unit (RU), a Near-Real Time (Near-RT) RAN Intelligent Controller (RIC), or a Non-Real Time (Non-RT) RIC.

The radar receiver 1104 and the radar transmitter 1100 can perform RF sensing (e.g., monostatic, bistatic, and/or multistatic sensing) of the target 1102 to obtain RF sensing measurements (e.g., RTT, TOA, and/or TDOA measurements) of the target 1102. In some examples, the system may comprise more than one radar receiver 1104 (e.g., for performing multistatic sensing), more than one radar transmitter 1100 (e.g., for performing bistatic sensing), more than one first network entity 1106, more than one second network entity 1108, and/or more than one target 1102, as is illustrated in FIG. 11. In some examples, at least one radar transmitter 1100 may be co-located with a radar receiver 1104 for performing monostatic sensing, for example.

The RF sensing measurements of the target 1102 may be used (e.g., by at least one processor(s) of the radar receiver 1104 and/or the first network entity 1106) to determine one or more characteristics (e.g., location, distance, movement, heading, size, and/or other characteristics) of the target 1102, which are indicative of the sensing environment of the radar receiver 1104. The characteristics of the target 1102, which indicate the sensing environment, can be used (e.g., by at least one processor(s) of the radar receiver 1104 and/or by the first network entity 1106) to determine the sensing measurement accuracy of the radar receiver 1104. It should be noted, in some examples, additional measurements (e.g., LIDAR measurements, ultrasound measurements, and/or positioning measurements) may also be used to determine the sensing measurement accuracy of the radar receiver 1104.

In one or more examples, the system of FIG. 11 may perform radar RS-based sensing (e.g., where the radar receiver 1104 determines the characteristics of the target 1102 and determines the sensing measurement accuracy the radar receiver 1104), or may perform network-based sensing (e.g., where the first network entity 1106 determines the characteristics of the target 1102 and determines the sensing measurement accuracy for the radar receiver 1104).

During operation of the system of FIG. 11 for radar RS-based sensing, the second network entity 1108 (e.g., which may monitor, control, and/or manage communications) may determine that the communications transmissions of the system are overloaded. The second network entity 1108 may send an inquiry to the first network entity 1106 (e.g., radar server) for RF sensing resources that can be utilized for communications purposes.

Upon receiving the inquiry for resources from the second network entity 1108, the first network entity 1106 may then transmit a request for resources that can be utilized for communications purposes within resource allocation signaling to the radar receiver 1104. In some examples, the resource allocation signaling may be transmitted by the first network entity 1106 to the radar receiver 1104, such as directly to the radar receiver 1104 or via the radar transmitter 1100. In some aspects, the second network entity 1108 may transmit the inquiry directly to the radar receiver 1104, in which case the inquire may include the request for the resources that can be utilized or re-allocated for communications purposes.

In one or more examples, when the radar receiver 1104 is in the form of a UE (as is shown in FIG. 11), the resource allocation signaling may be transmitted utilizing slot format indicator (SFI)-based signaling or preemption-based signaling. In some examples, for the SFI-based signaling, the radar receiver 1104 and/or the radar transmitter 1000 may transmit a slot format combination in SFI downlink control information (DCI) (e.g., of a physical downlink control channel (PDCCH)) for the radar receiver 1004 to determine a symbol pattern (e.g., whether symbols are configured for downlink (DL), uplink (UL), or flexible (F)) for a particular slot. In some aspects, the SFI DCI may be based on an existing SFI DCI format (e.g., DCI format 2_0) or a new DCI format dedicated for RF sensing or joint communications and sensing. For instance, for the new DCI format, there may be a special type of slot format defined for joint communications and RF sensing, where some symbols could be used for sensing only or for joint communications and sensing. For example, the joint communications and RF sensing slot format can be associated with a new "R" type of symbol to indicate that a sensing resource symbol with the "R" designation can be used to transmit or receive communications data. In some cases, a DCI field of the DCI indicates a slot format combination index used for RF sensing or joint communications and sensing. For instance, the index can be included in a set of slot format combinations configured by the network (e.g., a base station, such as a gNB, or portion thereof), such as in radio resource control (RRC) signaling. In some aspects, an SFI DCI that indicates a slot format is dedicated for communications (e.g., an "R" indicator), it can implicitly indicate that the network (e.g., a base station or portion thereof) will allocate the resource scheduled periodical radar signal (e.g., radar RS) for communications purposes. For example, if the radar receiver 1004 receives the SFI DCI that indicates the slot format is dedicated for communications, the radar receiver 1004 can implicitly determine that the network will allocate the RF sensing resource (e.g., the radar RS) for communications data. An illustrative example of the SFI-based signaling is discussed in more detail in the description of FIG. 12.

For preemption-based signaling, the preempted resources can be indicated by a group common DCI (GC-DCI) carrying a preemption indication (PI) to indicate that sensing resources can be used for communications purposes. In some cases, a group common DCI (GC-DCI) may be used for preemption-based signaling. In some examples, UE preemption indication monitoring is configured by RRC signaling. In some aspects, preempted resources are indicated by GC-DCI carrying the preemption indication. In some examples, when the preemption resources are the resources scheduled for RF sensing, it can implicitly indicate that the network (e.g., a base station, such as a gNB, or a portion thereof) will allocate these resources for communications purpose. An illustrative example of the preemption-based signaling is discussed in more detail in the descriptions of FIGS. 13A and 13B.

In some examples, when the radar receiver 1104 is in the form of a base station (e.g., a gNB or a portion thereof such as in a disaggregated architecture) and the radar transmitter 1100 is in the form of a UE, the resource allocation signaling may be transmitted utilizing SFI-based signaling (e.g., which can be applied to the serving gNB) or preemption-based signaling (e.g., which can be applied to the serving gNB). In other examples, when the radar receiver 1104 is in the form of a base station (e.g., a gNB or a portion thereof such as in a disaggregated architecture) and the radar transmitter 1100 is in the form of a base station (e.g., a gNB or a portion thereof), the resource allocation signaling may be transmitted utilizing NRPPa or other protocol or messaging.

Once the radar receiver 1104 receives the resource allocation signaling (e.g., which contains a request for resources) from the first network entity 1106, the radar receiver 1104 may perform sensing (e.g., bistatic sensing) of the target 1102 to obtain RF sensing measurements. For the bistatic sensing, as is shown in FIG. 11, the radar transmitter 1100 may transmit RF sensing signals towards the target 1102. The RF sensing signals reflect off of the target 1102 to generate RF reflection sensing signals. The radar receiver 1104 may receive the RF reflection sensing signals. At least one processor (e.g., processor 522 of FIG. 5) of the radar receiver 1104 can then determine the characteristics (e.g., location, distance, movement, and/or size) of the target 1102 by using RF sensing measurements from the received RF reflection sensing signals. The characteristics of the target 1102 are indicative of the sensing environment related to the radar receiver 1004, and the sensing environment is unknown before the scheduling of the transmission by the radar transmitter 1100 of the RF sensing signals.

At least one processor (e.g., processor 522 of FIG. 5) of the radar receiver 1104 can then determine performance metrics (e.g., operating range, maximum range, and/or range/Doppler accuracy) for the radar receiver 1104 by using the RF sensing measurements from the received RF reflection sensing signals.

After determining the characteristics of the target 1102 and the performance metrics for the radar receiver 1104, at least one processor (e.g., processor 522 of FIG. 5) of the radar receiver 1104 can determine the sensing measurement accuracy for the radar receiver 1104 by using the characteristics of the target 1102 and the performance metrics for the radar receiver 1104. At least one processor (e.g., processor 522 of FIG. 5) of the radar receiver 1104 can then determine, based on the sensing measurement accuracy for the radar receiver 1104 and/or the characteristics of the target 1102, whether any RF sensing resources allocated to the radar receiver 1104 can be re-allocated (and, if so, which specific resources) for communications purposes, while maintaining acceptable sensing measurement accuracy.

Based on determining the re-allocation of the sensing resources for communications purposes, the radar receiver 1104 can make some recommendations to the first network entity 1106 regarding the allocation of some of its resources for communication purposes. For example, the radar receiver 1104 can send a recommendation to modify an allocation (or re-allocation) of the RF sensing resources (e.g., by transmitting one or more messages, which can include one or more IEs or fields with an indication to modify the allocation) to the first network entity 1106 and/or the second network entity 1108. In some examples, similar to that described above with respect to FIG. 10, the radar receiver 1104 can transmit a message with a recommendation (e.g., via one or more IEs or fields of a message) to cancel the transmission, by the radar transmitter 1100, of scheduled periodical RF sensing signals; to reduce the frequency by which the scheduled periodical RF sensing signals are transmitted to the radar receiver 1104; to reduce the bandwidth and/or time duration of the scheduled periodical RF sensing signals; to increase the period of transmission of the scheduled periodical RF sensing signals; and/or to decrease the number of antenna beams for each radar RS resource set for the scheduled periodical RF sensing signals.

The radar receiver 1104 may transmit these resource allocation recommendations within a message to the first network entity 1106 (e.g., radar server). In some aspects, the message may additionally include the RF sensing measurements from the received RF reflection sensing signals. In some cases, the message may be transmitted by the radar receiver 1104 to the first network entity 1106 via the radar transmitter 1100. In some examples, the message may be transmitted utilizing LPP, NRPPa, a radio resource control (RRC) protocol, downlink control information (DCI), or a medium access control-control element (MAC-CE), or other protocol or messaging.

Once the first network entity 1106 receives the message from the radar receiver 1104, the first network entity 1106 can determine a specific allocation of resources from the radar receiver 1104 (and/or the radar transmitter 1100) to be used for communications purposes, based on the resource allocation recommendations from the radar receiver 1104 and the RF sensing measurements from the received RF reflection sensing signals. The first network entity 1106 may then transmit resource allocation signaling to the radar receiver 1104 (and/or the radar transmitter 1100) indicating specific resources of the radar receiver 1104 (and/or radar transmitter 1100) to be allocated for communications purposes. The resource allocation signaling transmitted from the first network entity 1106 to the radar receiver 1104 (and/or radar transmitter 1100) may utilize SFI-based signaling, preemption-based signaling, and/or NRPPa protocol, as previously described above, or other protocol or messaging.

In some examples, as noted above, the system of FIG. 11 can be operated for network-based sensing. During operation of the system of FIG. 11 for network-based sensing, the second network entity 1108 (e.g., when may monitoring, controlling, and/or managing communications) may determine that the communications transmissions of the cellular system are overloaded. The second network entity 1108 may transmit an inquiry to the first network entity 1106 for resources that can be utilized for communications purposes.

Also during operation of the system, the radar receiver 1104 may perform sensing (e.g., bistatic sensing) of the target 1102 to obtain RF sensing measurements. For example, when performing bistatic sensing of the target

1102, the radar transmitter 1100 can transmit RF sensing signals towards the target 1102. The RF sensing signals can reflect off of the target 1102 to produce RF reflection sensing signals. The radar receiver 1104 can receive the RF reflection sensing signals.

The radar receiver 1104 may then transmit the RF sensing measurements from the received RF reflection sensing signals within a message to the first network entity 1106 (e.g., radar server). In some examples, the message may be transmitted by the radar receiver 1104 to the first network entity 1106 via the radar transmitter 1100. In one or more examples, the message may be transmitted utilizing LPP, NRPPa, a radio resource control (RRC) protocol, downlink control information (DCI), or a medium access control-control element (MAC-CE), or other protocol or messaging.

After receiving the inquiry for resources from the second network entity 1108 and receiving the RF sensing measurements form the radar receiver 1104, at least one processor (e.g., processor 522 of FIG. 5) of the first network entity 1106 can determine the characteristics (e.g., location, distance, movement, and/or size) of the target 1102 by using the RF sensing measurements from the received RF reflection sensing signals. At least one processor (e.g., processor 522 of FIG. 5) of the first network entity 1106 can also determine performance metrics (e.g., operating range, maximum range, and/or range/Doppler accuracy) for the radar receiver 1104 by using the RF sensing measurements from the received RF reflection sensing signals.

After determining the characteristics of the target 1102 and the performance metrics for the radar receiver 1104, at least one processor (e.g., processor 522 of FIG. 5) of the first network entity 1106 can determine the sensing measurement accuracy for the radar receiver 1104 by using the determined characteristics of the target 1102 and the performance metrics for the radar receiver 1104. At least one processor (e.g., processor 522 of FIG. 5) of the first network entity 1106 can then determine, based on the sensing measurement accuracy for the radar receiver 1104 and/or the characteristics of the target 1102, whether the radar receiver 1104 can allocate some of its sensing resources (and, if so, which specific resources) for communications purposes, while maintaining acceptable sensing measurement accuracy.

The first network entity 1106 can then determine a specific allocation of resources from the radar receiver 1104 (and/or the radar transmitter 1100) to be used for communications purposes, based on the sensing measurement accuracy for the radar receiver 1104 and/or the characteristics of the target 1102. For example, similar to that described previously, the first network entity 1106 may determine to cancel the transmission, by the radar transmitter 1000, of scheduled periodical RF sensing signals, to reduce the frequency bandwidth allocation for the scheduled periodical RF sensing signals, to reduce the bandwidth and/or time duration of the scheduled periodical RF sensing signals, to increase the period of transmission of the scheduled periodical RF sensing signals and/or to decrease the number of antenna beams for each radar RS resource set for the scheduled periodical RF sensing signals.

After the first network entity 1106 determines the specific allocation of resources from the radar receiver 1104 (and/or the radar transmitter 1100) to be utilized for communications purposes, the first network entity 1106 may transmit resource allocation signaling, which indicates the specific resources of the radar receiver 1104 (and/or radar transmitter 1100) to be allocated for communications purposes, to the radar receiver 1104 (and/or the radar transmitter 1100). In some examples, the resource allocation signaling can be transmitted by the first network entity 1106 to the radar receiver 1104 via the radar transmitter 1100.

In some examples, such as when the radar receiver 1104 is in the form of a UE (as is shown in FIG. 11), the resource allocation signaling may be transmitted using SFI-based signaling or preemption-based signaling. An illustrative example of SFI-based signaling is described below with respect to FIG. 12. An illustrative example of preemption-based signaling is described below with respect to FIGS. 13A and 13B. In one or more examples, such as when the radar receiver 1104 is in the form of a base station (e.g., a gNB) and the radar transmitter 1100 is in the form of a UE, the resource allocation signaling may be transmitted utilizing SFI-based signaling or preemption-based signaling. In other examples, such as when the radar receiver 1104 is in the form of a base station (e.g., a gNB) and the radar transmitter 1100 is in the form of a base station (e.g., a gNB), the resource allocation signaling may be transmitted using NRPPa or other protocol or messaging.

FIG. 12 is a diagram illustrating an example slot format table 1200 that may be modified for slot format indicator (SFI)-based signaling. As noted previously, the slot format table 1200 configured for SFI-based signaling may be employed by the disclosed systems and techniques for resource allocation for joint communications and RF sensing, in accordance with some examples. In one or more examples, the slot format (e.g., as designated in a slot format table 1200) may provide a network entity (e.g., a UE) with the required downlink and/or uplink transmission pattern. In some aspects, the slot format may provide the network entity an indication of (or an indication to modify) an allocation of some of its resources (e.g., allocating RF sensing resources for communications purposes).

In one or more examples, a slot can be utilized as a dynamic scheduling unit (e.g., for communications and/or for RF sensing). The number of OFDM symbols per slot is typically fixed (e.g., as in NR). For example, when the cyclic prefixes (CPs) of an OFDM waveform have a normal duration, there are typically a total of fourteen OFDM symbols. In another example, when the CPs of an OFDM waveform have an extended duration, there are typically a total of twelve slots. The example slot format table 1200 in FIG. 12 shows a total of fourteen OFDM symbols per slot.

In some cases, a slot may be classified as downlink, where all of the symbols of the slot are dedicated for the downlink transmissions. In some cases, a slot may be classified as uplink, where all of the symbols of the slot are dedicated for uplink transmissions. In the case of frequency division duplexing (FDD), all symbols within a slot for a downlink carrier are used for downlink transmissions, and all symbols within a slot for an uplink carrier are used for uplink transmissions.

However, in the case of time division duplexing (TDD) (e.g., as is shown in the slot format table 1200 of FIG. 12), it is possible for a slot to be configured to be used for a mix of uplink and downlink transmissions. When using a mix of uplink and downlink transmissions for a slot, a guard period may be necessary for the transceiver switching from the downlink to the uplink, and to allow for a timing advance in the uplink.

NR TDD utilizes a flexible slot configuration (e.g., which is shown in the slot format table 1200 of FIG. 12). For this configuration, OFDM symbols of a slot can be designated as "downlink" (e.g., represented by a "D" letter) for downlink transmissions, "uplink" (e.g., representing by a "U" letter) for uplink transmissions, or "flexible" (e.g., represented by an "F" letter). The flexible symbol "F" can be configured for either uplink or downlink transmissions. One of the intentions of introducing the flexible symbols within the slots is to handle the required guard period. It should be noted that if a slot format is not provided by the network (e.g., a network entity), all of the OFDM symbols are considered to be "flexible" as a default.

NR supports the slot format configuration in static, semi-static, or dynamic fashion. The static slot configuration and the semi-static slot configuration are executed using RRC, while the dynamic slot configuration is executed using physical downlink control channel (PDCCH) DCI. In TDD, for small and/or isolated cells, dynamic TDD may be more suitable to adapt to variations in traffic. For large cells, the semi-static TDD may be more suitable for handling interference issues.

The system of the present disclosure proposes utilizing a modified version of the slot format table 1200 of FIG. 12 for the SFI-based signaling. In particular, the slot format table 1200 is a modified version of an existing slot format table and includes an "R" designation for certain OFDM symbols. The "R" designation indicates that the resource can be used for communications purposes, for RF sensing purposes, or for joint communications and RF sensing purposes. For example, if the slot format table 1200 is directed to the format for slots for RF sensing purposes, the "R" symbol would indicate that the resource can be used for communications purposes. Conversely, if the slot format table 1200 is directed to the format for slots for communications purposes, the "R" symbol would indicate that the resource can be used for RF sensing purposes. As such, the modified slot format table 1200 may comprise indications for "uplink" (e.g., as denoted by a "U" letter), "downlink" (e.g., as denoted by a "D" letter), "flexible" (e.g., as denoted by an "F" letter), as well as "resource" (e.g., as denoted by an "R" letter).

Figure 13A:
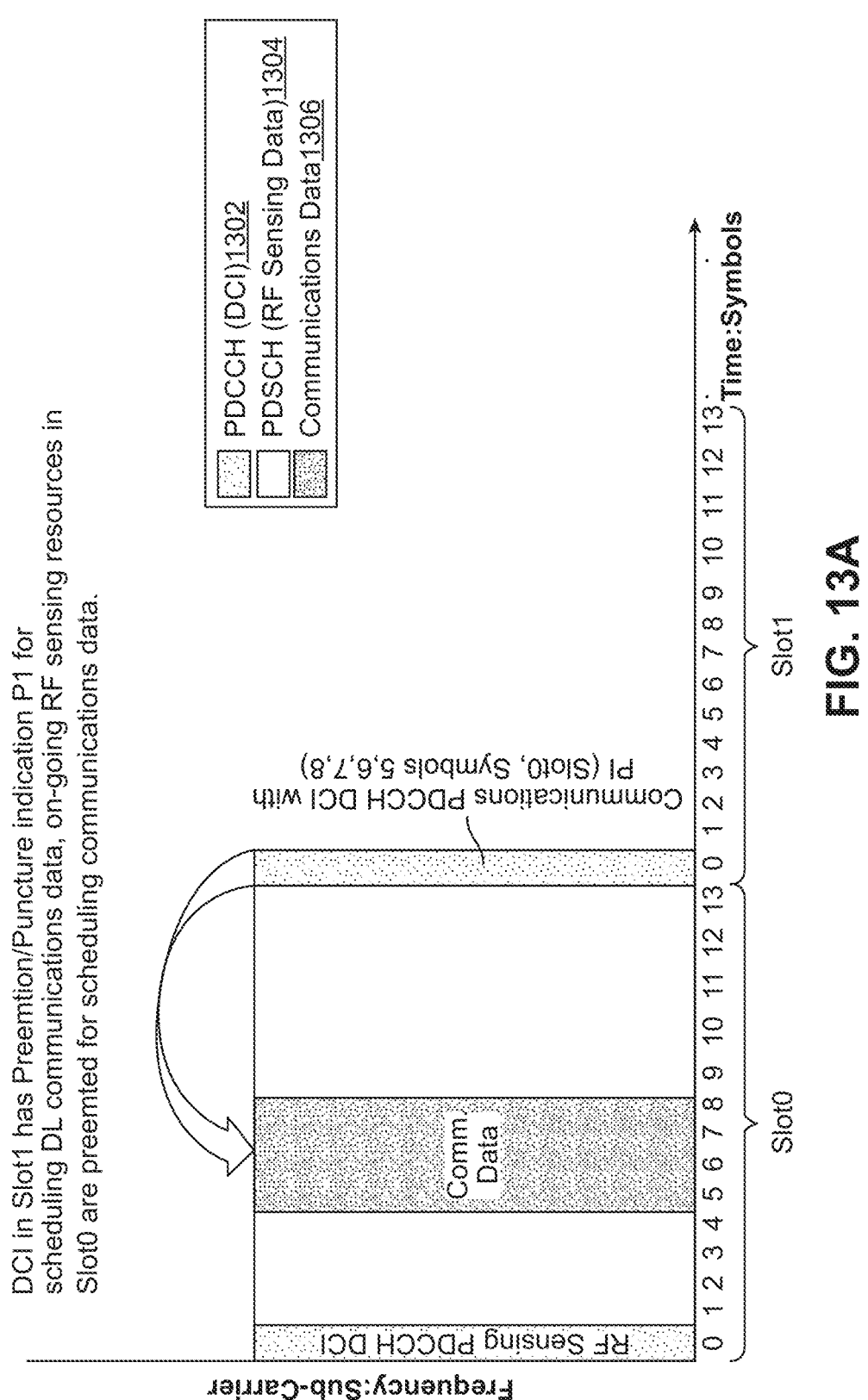
FIGS. 13A and 13B are diagrams illustrating preemption-based signaling, which may be employed by the disclosed systems and techniques for resource allocation for joint communications and RF sensing, in accordance with some examples.
Figure 13B:
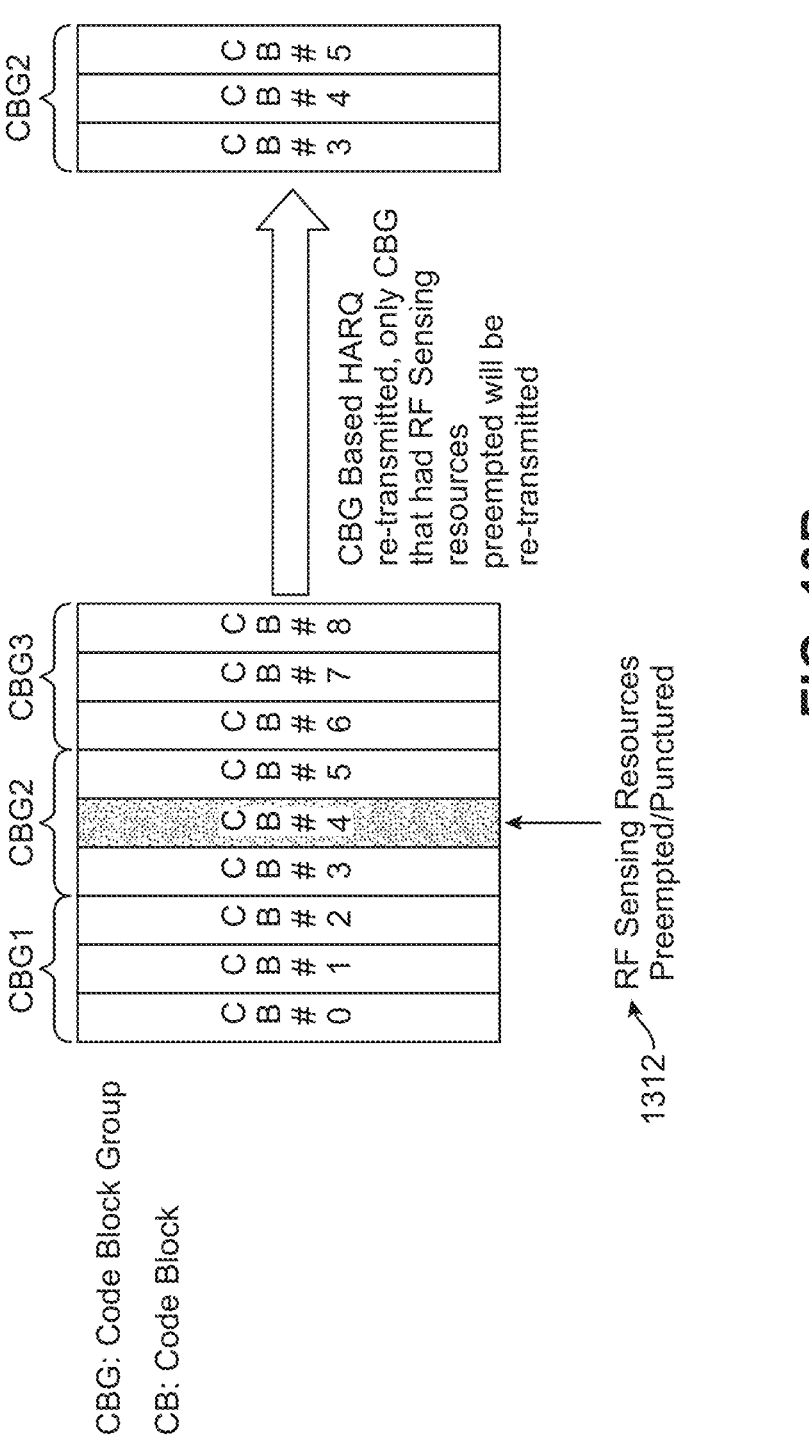

FIGS. 13A and 13B are diagrams that together illustrate preemption-based signaling. As previously noted, the preemption-based signaling may be employed by the disclosed systems and techniques for resource allocation for joint communications and RF sensing, in accordance with some examples. A physical downlink control channel (PDCCH) 1302 including downlink control information (DCI) and a physical downlink shared channel (PDSCH) 1304 including RF sensing data are shown in FIG. 13A. In one or more examples, preemptive scheduling of communications data 1306 may be utilized for the preemption-based resource allocation signaling of the disclosed system. For instance, the preemptive scheduling may be utilized to preempt (over-write) the scheduling of the transmission of RF sensing data for the transmission of the communications data 1306, according to aspects described herein. In other examples, preemption scheduling may be utilized to preempt (over-write) the scheduling of the transmission of communications data for the transmission of RF sensing data, according to aspects described herein.

In preemptive scheduling, RF sensing data traffic may be scheduled on all available RF resources within a transmission time interval (TTI) (e.g., a duration of one millisecond). When communications data 1306 is scheduled for a corresponding network node or device (e.g., a UE), part of the ongoing RF sensing resources (shown as eMBB resources 1312 in FIG. 13B) in a particular slot are overwritten (preempted) to schedule the communications data 1306. The RF sensing resources 1312 to be preempted may be communicated to the network entity by a preemption indication (PI) information element (IE) carried within the PDCCH DCI in the upcoming slot (as shown in FIG. 13A). The RF sensing resources, received at the network entity, that are indicated by the PI are essentially erased. It should be noted that since NR utilizes a code block group (CBG)-based HARQ re-transmission, in some cases only the CBGs that have the preempted RF sensing resources are retransmitted and soft combined to retrieve the actual RF sensing transport block (TB).

FIG. 14 is a flow chart illustrating an example of a process 1400 for wireless communications. The process 1400 can be performed by a radar receiver (e.g., a user equipment (UE) such as mobile device, vehicle, roadside unit (RSU) or other UE, or a network entity such as an eNB, a gNB, a radar server, a location server such as an LMF, or a portion thereof, such as one or more of a CU, a DU, a RU, a Near-RT RIC, or a Non-RT RIC) or by a component or system (e.g., a chipset) of the radar receiver. For example, the radar receiver may include the radar receiver 1004 of FIG. 10, the radar receiver 1104 of FIG. 11, or a network entity (e.g., the radar transmitter 1000 of FIG. 10 or the radar transmitter 1100 of FIG. 11). The operations of the process 1400 may be implemented as software components that are executed and run on one or more controllers or processors of the radar receiver (e.g., the controller/processor 280 of FIG. 2, the receiver processor 258 of FIG. 2, the transmit processor 264 of FIG. 2, the memory 282 of FIG. 2, the processor(s) 484 of FIG. 4, the DSP(s) 482 of FIG. 4, the memory device(s) 486 of FIG. 4, the processor 1710 of FIG. 17, the memory 1715 of FIG. 17, the ROM 1720 of FIG. 17, the RAM 1725 of FIG. 17, or other controller(s) or processor(s)). Further, the transmission and reception of signals by the radar receiver in the process 1400 may be enabled, for example, by one or more antennas and/or one or more transceivers (e.g., controller/processor 280 of FIG. 2, transmit processor 264 of FIG. 2, TX MIMO processor 266 of FIG. 2, DEMODs 254*a* through 254*r* of FIG. 2, antennas 252*a* through 252*r* of FIG. 2, the one or more wireless transceivers 478 of FIG. 4, the one or more modems 476 of FIG. 4, the one or more processors 484 of FIG. 4, the one or more DSPs 482 of FIG. 4, the one or more memory devices 486 of FIG. 4, any combination thereof, communication interface 1740 of FIG. 17, etc.).

At block 1410, the radar receiver (or component thereof) may determine a sensing measurement accuracy of the radar receiver based on one or more measurements associated with at least one target. In some aspects, the one or more measurements include sensing measurements, light detection and ranging (LIDAR) measurements, ultrasound measurements, positioning measurements, any combination thereof, and/or other measurements. In some cases, the sensing measurements are obtained based on monostatic sensing, bistatic sensing, or multistatic sensing, such as that described with respect to FIGS. 5-9. In some examples, the sensing measurements include round trip time (RTT) measurements, time of arrival (TOA) measurements, time difference of arrival (TDOA) measurements, angle of arrival (AOA) measurements, angle of departure (AOD) measurements, any combination thereof, and/or other measurements.

At block 1420, the radar receiver (or component thereof) may transmit, based on the sensing measurement accuracy, a message to a network entity. In the event the radar receiver is a UE, the network entity may include a radar server (e.g., network entity 1006 of FIG. 10 or first network entity 1106 of FIG. 11) or a base station (e.g., radar transmitter 1000 of FIG. 10 or second network entity 1108 of FIG. 11) or one or more of a CU, a DU, a RU, a Near-RT RIC, or a Non-RT RIC of the base station. In the event the radar receiver is a base station (or one or more of a CU, a DU, a RU, a Near-RT RIC, or a Non-RT RIC of the base station), the network entity may include a radar server (e.g., network entity 1006 of FIG. 10 or first network entity 1106 of FIG. 11) or an additional base station (e.g., the second network entity 1108 of FIG. 11) or one or more of a CU, a DU, a RU, a Near-RT RIC, or a Non-RT RIC of the additional base station.

As described above with respect to FIG. 10 and FIG. 11, the message transmitted to and received by the network entity includes an indication to modify an allocation of sensing resources associated with the radar receiver for communications data. In some cases, the message includes the one or more measurements (or information representing the one or more measurements). In one illustrative example, the indication to modify the allocation of sensing resources comprises a recommendation for re-allocation of the sensing resources for the communications data. In another illustrative example, the indication to modify the allocation of sensing resources comprises a recommendation to cancel the sensing resources. In another illustrative example, the indication to modify the allocation of sensing resources comprises a recommendation to increase or decrease a period of the sensing resources. In another illustrative example, the indication to modify the allocation of sensing resources comprises a recommendation to reduce a bandwidth of the sensing resources. In another illustrative example, the indication to modify the allocation of sensing resources comprises a recommendation to reduce a time duration of the sensing resources. In another illustrative example, the indication to modify the allocation of sensing resources comprises a recommendation to reduce a number of beams for each sensing resource of the sensing resources.

In some aspects, the radar receiver (or component thereof) may receive, from the network entity or an additional network entity, a request for the message including the indication to modify the allocation of sensing resources. In one illustrative example, the network entity is a radar server (e.g., network entity 1006 of FIG. 10 or first network entity 1106 of FIG. 11) and the additional network entity is a base station (e.g., radar transmitter 1000 of FIG. 10 or second network entity 1108 of FIG. 11) or one or more of a CU, a DU, a RU, a Near-RT RIC, or a Non-RT RIC of the base station. For instance, referring to FIG. 10 and FIG. 11 as illustrative examples, the network entity 1006 of FIG. 10 or the first network entity 1106 of FIG. 11 can transmit the request and the radar receiver 1004 of FIG. 10 or the radar receiver 1104 of FIG. 11 can receive the request.

In some aspects, the message is transmitted using a long-term evolution positioning protocol (LPP), a New Radio Positioning Protocol A (NRPPa), a radio resource control (RRC) protocol, downlink control information (DCI), or a medium access control-control element (MAC-CE).

The radar receiver (or component thereof) may receive, from the network entity (e.g., the radar server, base station, or portion thereof) or the additional network entity (e.g., the base station or portion thereof), resource allocation signaling for the communications data based on the indication to modify the allocation of sensing resources associated with the radar receiver for the communications data. In one illustrative example, as described above with respect to FIG. 11, once the first network entity 1106 receives the message from the radar receiver 1104 (e.g., directly from the radar receiver 1104 or via the second network entity 1108), the first network entity 1106 can determine a specific allocation of resources from the radar receiver 1104 (and/or the radar transmitter 1100) to be used for communications purposes, based on the resource allocation recommendations from the radar receiver 1104 and the RF sensing measurements from the received RF reflection sensing signals. The first network entity 1106 may then transmit resource allocation signaling to the radar receiver 1104 (and/or the radar transmitter 1100) indicating specific resources of the radar receiver 1104 (and/or radar transmitter 1100) to be allocated for communications purposes. The resource allocation signaling transmitted from the first network entity 1106 to the radar receiver 1104 (and/or radar transmitter 1100) may utilize SFI-based signaling, preemption-based signaling, and/or NRPPa protocol, as described above, or other protocol or messaging.

Figure 15:
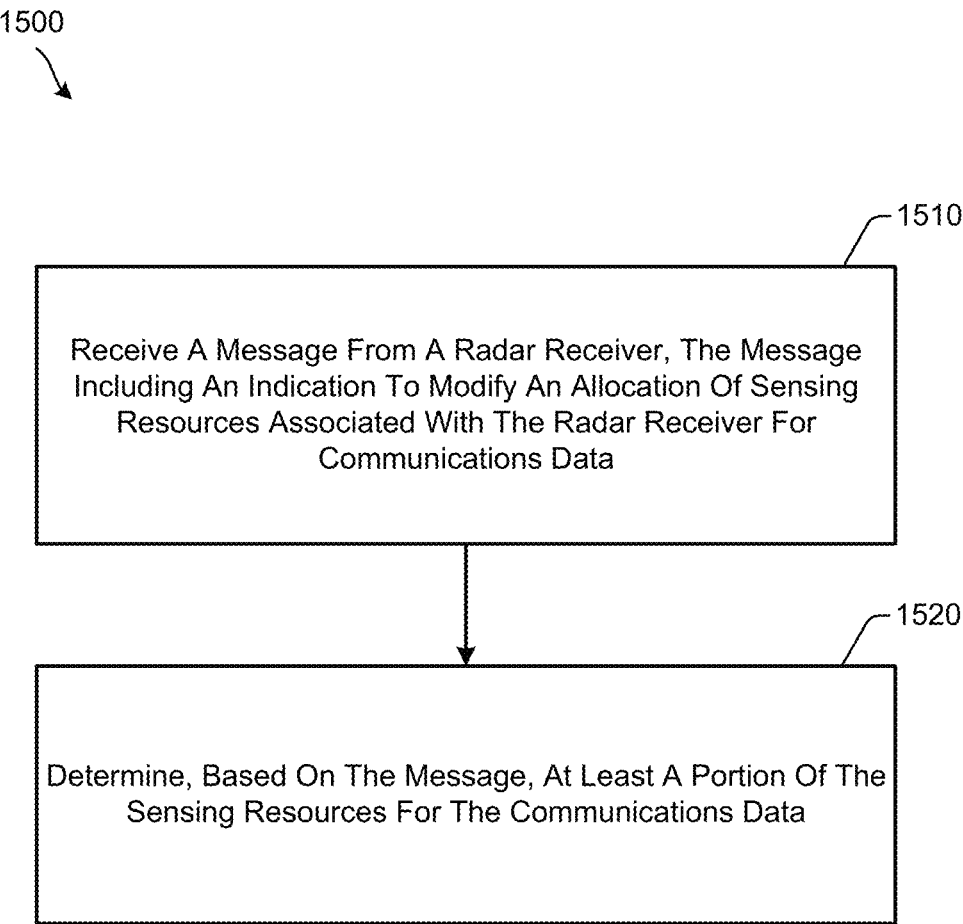
FIG. 15 is a flow chart illustrating another example of a process for resource allocation for joint communications and RF sensing, in accordance with some examples.

FIG. 15 is a flow chart illustrating an example of a process 1500 for wireless communications. The process 1500 can be performed by a network entity (e.g., an eNB, a gNB, a radar server, a location server such as an LMF, or a portion thereof, such as one or more of a CU, a DU, a RU, a Near-RT RIC, or a Non-RT RIC) or by a component or system (e.g., a chipset) of the network entity. For example, the network entity may include the radar transmitter 1000 of FIG. 10, the network entity 1006 of FIG. 10, the radar transmitter 1100 of FIG. 11, the first network entity 1106 of FIG. 11, or the second network entity 1108 of FIG. 11. The operations of the process 1500 may be implemented as software components that are executed and run on one or more controllers or processors of the network entity (e.g., the controller/processor 240 of FIG. 2, the receiver processor 238 of FIG. 2, the transmit processor 220 of FIG. 2, the memory 242 of FIG. 2, the processor 1710 of FIG. 17, the memory 1715 of FIG. 17, the ROM 1720 of FIG. 17, the RAM 1725 of FIG. 17, or other controller(s) or processor(s)). Further, the transmission and reception of signals by the network entity in the process 1500 may be enabled, for example, by one or more antennas and/or one or more transceivers (e.g., controller/processor 240 of FIG. 2, transmit processor 210 of FIG. 2, TX MIMO processor 230 of FIG. 2, DEMODs 232a through 232t of FIG. 2, antennas 234a through 234t of FIG. 2, communication interface 1740 of FIG. 17, etc.).

At block 1510, the network entity (or component thereof) may receive a message from a radar receiver (e.g., radar receiver 1004 of FIG. 10, radar receiver 1104 of FIG. 11, radar transmitter 1000 of FIG. 10, radar transmitter 1100 of FIG. 11, or other device that can operate as a radar receiver). In some cases, the message is received via a long-term evolution positioning protocol (LPP), a New Radio Positioning Protocol A (NRPPa), a radio resource control (RRC) protocol, downlink control information (DCI), or a medium access control-control element (MAC-CE).

As described above with respect to FIG. 10 and FIG. 11, the message includes an indication to modify an allocation of sensing resources associated with the radar receiver for communications data. In some aspects, at least the portion of the sensing resources associated with the radar receiver includes positioning resources. In some cases, at least the portion of the sensing resources are determined based on sensing measurement accuracy of the radar receiver based on measurements obtained by the radar receiver. The sensing measurement accuracy can be determined by the radar receiver, the network entity (or component thereof), or other device or entity. For instance, in some examples, the network entity (or component thereof) may determine the sensing measurement accuracy of the radar receiver based on the measurements obtained by the radar receiver.

In some aspects, the network entity (or component thereof) may transmit a request for the message for receipt by the radar receiver. For instance, referring to FIG. 10 and FIG. 11 as illustrative examples, the network entity 1006 of FIG. 10 or the first network entity 1106 of FIG. 11 can transmit the request to the radar receiver 1004 of FIG. 10 or the radar receiver 1104 of FIG. 11. The radar receiver may transmit the message to the network entity in response to receiving the request for the message. In some cases, the network entity (or component thereof) may transmit a request for the message to an additional network entity in communication with the radar receiver. For instance, referring to FIG. 11 as an illustrative example, the second network entity 1108 can transmit the request to the first network entity 1106, which can send the request to the radar receiver 1104 of FIG. 11. In another example, first network entity 1106 can transmit the request to the radar transmitter 1100 (which may be a network entity in some examples), which can send the request to the radar receiver 1104 of FIG. 11.

At block 1520, the network entity (or component thereof) may, based on the message, at least a portion of the sensing resources for the communications data. In one illustrative example, the indication to modify the allocation of sensing resources comprises a recommendation for re-allocation of the sensing resources for the communications data. In another illustrative example, the indication to modify the allocation of sensing resources comprises a recommendation to cancel the sensing resources. In another illustrative example, the indication to modify the allocation of sensing resources comprises a recommendation to increase or decrease a period of the sensing resources. In another illustrative example, the indication to modify the allocation of sensing resources comprises a recommendation to reduce a bandwidth of the sensing resources. In another illustrative example, the indication to modify the allocation of sensing resources comprises a recommendation to reduce a time duration of the sensing resources. In another illustrative example, the indication to modify the allocation of sensing resources comprises a recommendation to reduce a number of beams for each sensing resource of the sensing resources.

In some aspects, the message includes measurements (or information representing the measurements) obtained by the radar receiver. In some cases, the measurements include sensing measurements, light detection and ranging (LIDAR) measurements, ultrasound measurements, positioning measurements, any combination thereof, and/or other measurements. In some examples, the sensing measurements are obtained based on monostatic sensing, bistatic sensing, or multistatic sensing. In some implementations, the sensing measurements include round trip time (RTT) measurements, time of arrival (TOA) measurements, time difference of arrival (TDOA) measurements, angle of arrival (AOA) measurements, angle of departure (AOD) measurements, any combination thereof, and/or other measurements.

FIG. 16 is a flow chart illustrating an example of a process 1600 for wireless communications. The process 1600 can be performed by a network entity (e.g., an eNB, a gNB, a radar server, a location server such as an LMF, or a portion thereof, such as one or more of a CU, a DU, a RU, a Near-RT RIC, or a Non-RT RIC) or by a component or system (e.g., a chipset) of the network entity. For example, the network entity may include the radar transmitter 1000 of FIG. 10, the network entity 1006 of FIG. 10, the radar transmitter 1100 of FIG. 11, the first network entity 1106 of FIG. 11, or the second network entity 1108 of FIG. 11. The operations of the process 1600 may be implemented as software components that are executed and run on one or more controllers or processors of the network entity (e.g., the controller/processor 240 of FIG. 2, the receiver processor 238 of FIG. 2, the transmit processor 220 of FIG. 2, the memory 242 of FIG.

Figure 17:
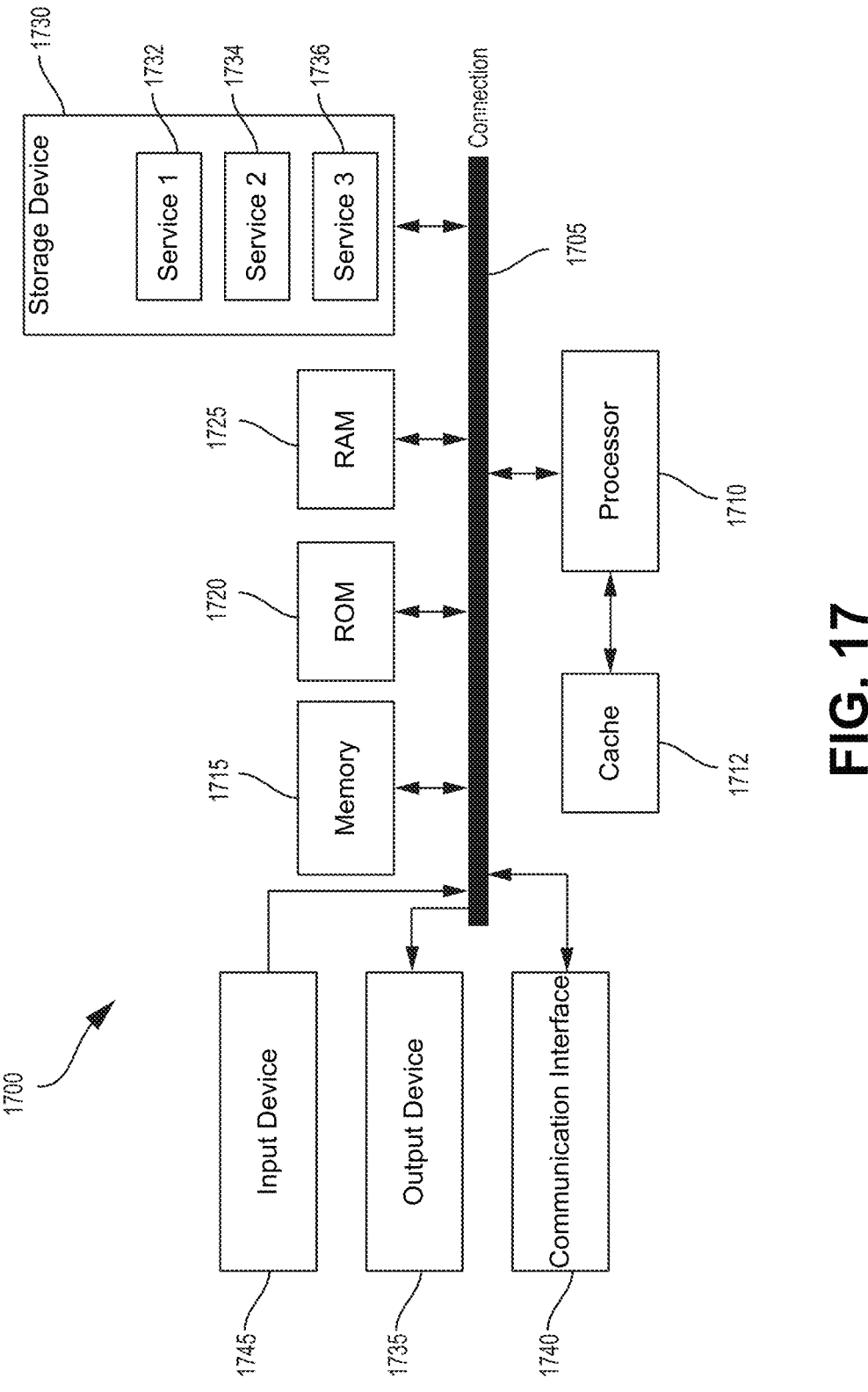
FIG. 17 is a block diagram illustrating an example of a computing system that may be employed by the disclosed system for resource allocation for joint communications and RF sensing, in accordance with some examples.

2, the processor 1710 of FIG. 17, the memory 1715 of FIG. 17, the ROM 1720 of FIG. 17, the RAM 1725 of FIG. 17, or other controller(s) or processor(s)). Further, the transmission and reception of signals by the network entity in the process 1600 may be enabled, for example, by one or more antennas and/or one or more transceivers (e.g., controller/processor 240 of FIG. 2, transmit processor 210 of FIG. 2, TX MIMO processor 230 of FIG. 2, DEMODs 232a through 232t of FIG. 2, antennas 234a through 234t of FIG. 2, communication interface 1740 of FIG. 17, etc.).

At block 1610, the network entity (or component thereof) may receive a resource allocation request from an additional network entity for an allocation of sensing resources for communications data. For instance, referring to FIG. 11 as an illustrative example, the second network entity 1108 may send an inquiry to the first network entity 1106 for RF sensing resources that can be utilized for communications purposes.

At block 1620, the network entity (or component thereof) may transmit a message to one or more radar devices. In some cases, the network entity (or component thereof) may transmit the message using a New Radio Positioning Protocol A (NRPPa) or other protocol. As described above with respect to FIG. 10 and FIG. 11, the message includes information associated with an allocation of at least a portion of resources associated with the one or more radar devices for the communications data. In some cases, the message includes an indication of the allocation of at least the portion of the resources associated with the one or more radar devices for the communications data. In some examples, the message includes a request for resources from the one or more radar devices.

In some aspects, the message includes a slot format indicator (SFI). For instance, as described herein, the SFI may be transmitted in downlink control information (DCI) of a physical downlink control channel (PDCCH). The DCI may include an indication of a slot format combination index used for sensing or joint communications and sensing.

In some aspects, the message includes preemption-based signaling. For example, the preemption-based signaling may include an indication of sensing resources to be allocated for the communications data. In such an example, the indication of the sensing resources may be included in group common downlink control information (GC-DCI).

In some examples, the network entity (or component thereof) may determine a sensing measurement accuracy of the one or more radar devices using measurements obtained by the one or more radar devices. In some examples, the network entity (or component thereof) may determine at least the portion of the resources associated with the one or more radar devices based on the sensing measurement accuracy of the one or more radar devices.

FIG. 17 is a block diagram illustrating an example of a computing system 1700 that may be employed by the disclosed system for resource allocation for joint communications and RF sensing, in accordance with some examples. In particular, FIG. 17 illustrates an example of computing system 1700, which can be for example any computing device making up internal computing system, a remote computing system, a camera, or any component thereof in which the components of the system are in communication with each other using connection 1705. Connection 1705 can be a physical connection using a bus, or a direct connection into processor 1710, such as in a chipset architecture. Connection 1705 can also be a virtual connection, networked connection, or logical connection.

In some aspects, computing system 1700 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1700 includes at least one processing unit (CPU or processor) 1710 and connection 1705 that communicatively couples various system components including system memory 1715, such as read-only memory (ROM) 1720 and random access memory (RAM) 1725 to processor 1710. Computing system 1700 can include a cache 1712 of high-speed memory connected directly with, in close proximity to, or integrated as part of processor 1710.

Processor 1710 can include any general purpose processor and a hardware service or software service, such as services 1732, 1734, and 1736 stored in storage device 1730, configured to control processor 1710 as well as a special-purpose processor where software instructions are incorporated into the actual processor design. Processor 1710 may essentially be a completely self-contained computing system, containing multiple cores or processors, a bus, memory controller, cache, etc. A multi-core processor may be symmetric or asymmetric.

To enable user interaction, computing system 1700 includes an input device 1745, which can represent any number of input mechanisms, such as a microphone for speech, a touch-sensitive screen for gesture or graphical input, keyboard, mouse, motion input, speech, etc. Computing system 1700 can also include output device 1735, which can be one or more of a number of output mechanisms. In some instances, multimodal systems can enable a user to provide multiple types of input/output to communicate with computing system 1700.

Computing system 1700 can include communications interface 1740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1740 may also include one or more range sensors (e.g., LIDAR sensors, laser range finders, RF radars, ultrasonic sensors, and infrared (IR) sensors) configured to collect data and provide measurements to processor 1710, whereby processor 1710 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1740 may also include one or more Global Navigation Satellite System (GNSS) receivers or transceivers that are used to determine a location of the computing system 1700 based on receipt of one or more signals from one or more satellites associated with one or more GNSS systems. GNSS systems include, but are not limited to, the US-based GPS, the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1730 can include software services, servers, services, etc., that when the code that defines such software is executed by the processor 1710, it causes the system to perform a function. In some aspects, a hardware service that performs a particular function can include the software component stored in a computer-readable medium in connection with the necessary hardware components, such as processor 1710, connection 1705, output device 1735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram.

Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: A method for wireless communications at radar receiver, the method comprising: determining a sensing measurement accuracy of the radar receiver based on one or more measurements associated with at least one target; and transmitting, by the radar receiver based on the sensing measurement accuracy, a message to a network entity, the message including an indication to modify an allocation of sensing resources associated with the radar receiver for communications data.

Aspect 2: The method of Aspect 1, wherein the indication to modify the allocation of sensing resources comprises a recommendation for re-allocation of the sensing resources for the communications data.

Aspect 3: The method of any of Aspects 1 to 2, wherein the indication to modify the allocation of sensing resources comprises a recommendation to cancel the sensing resources.

Aspect 4: The method of any of Aspects 1 to 3, wherein the indication to modify the allocation of sensing resources comprises a recommendation to increase or decrease a period of the sensing resources.

Aspect 5: The method of any of Aspects 1 to 4, wherein the indication to modify the allocation of sensing resources comprises a recommendation to reduce a bandwidth of the sensing resources.

Aspect 6: The method of any of Aspects 1 to 5, wherein the indication to modify the allocation of sensing resources comprises a recommendation to reduce a time duration of the sensing resources.

Aspect 7: The method of any of Aspects 1 to 6, wherein the indication to modify the allocation of sensing resources comprises a recommendation to reduce a number of beams for each sensing resource of the sensing resources.

Aspect 8: The method of any of Aspects 1 to 7, further comprising: receiving, from the network entity or an additional network entity, a request for the message including the indication to modify the allocation of sensing resources.

Aspect 9: The method of Aspect 8, wherein the network entity is a radar server and the additional network entity is a base station.

Aspect 10: The method of any of Aspects 1 to 9, wherein the message comprises the one or more measurements.

Aspect 11: The method of any of Aspects 1 to 10, wherein the one or more measurements comprise at least one of sensing measurements, light detection and ranging (LIDAR) measurements, ultrasound measurements, or positioning measurements.

Aspect 12: The method of Aspect 11, wherein the sensing measurements are obtained based on at least one of monostatic sensing, bistatic sensing, or multistatic sensing.

Aspect 13: The method of any of Aspects 11 or 12, wherein the sensing measurements comprise at least one of round trip time (RTT) measurements, time of arrival (TOA) measurements, time difference of arrival (TDOA) measurements, angle of arrival (AOA) measurements, or angle of departure (AOD) measurements.

Aspect 14: The method of any of Aspects 1 to 13, wherein the radar receiver is a user equipment (UE) device and the network entity is one of a radar server or a base station.

Aspect 15: The method of any of Aspects 1 to 14, wherein the radar receiver is a base station and the network entity is one of a radar server or an additional base station.

Aspect 16: The method of any of Aspects 1 to 15, wherein the message is transmitted using one of a long-term evolution positioning protocol (LPP), a New Radio Positioning Protocol A (NRPPa), a radio resource control (RRC) protocol, downlink control information (DCI), or a medium access control-control element (MAC-CE).

Aspect 17: The method of any of Aspects 1 to 16, further comprising: receiving, at the radar receiver from the network entity, resource allocation signaling for the communications data based on the indication to modify the allocation of sensing resources associated with the radar receiver for the communications data.

Aspect 18: A method for resource allocation at a network entity, the method comprising: receiving, by the network entity, a message from a radar receiver, the message including an indication to modify an allocation of sensing resources associated with the radar receiver for communications data; and determining, by the network entity based on the message, at least a portion of the sensing resources for the communications data.

Aspect 19: The method of Aspect 18, wherein the indication to modify the allocation of sensing resources comprises a recommendation for re-allocation of the sensing resources for the communications data.

Aspect 20: The method of any of Aspects 18 to 19, wherein the indication to modify the allocation of sensing resources comprises a recommendation to cancel the sensing resources.

Aspect 21: The method of any of Aspects 18 to 20, wherein the indication to modify the allocation of sensing resources comprises a recommendation to increase or decrease a period of the sensing resources.

Aspect 22: The method of any of Aspects 18 to 21, wherein the indication to modify the allocation of sensing resources comprises a recommendation to reduce a bandwidth of the sensing resources.

Aspect 23: The method of any of Aspects 18 to 22, wherein the indication to modify the allocation of sensing resources comprises a recommendation to reduce a time duration of the sensing resources.

Aspect 24: The method of any of Aspects 18 to 23, wherein the indication to modify the allocation of sensing resources comprises a recommendation to reduce a number of beams for each sensing resource of the sensing resources.

Aspect 25: The method of any of Aspects 18 to 24, further comprising: transmitting a request for the message for receipt by the radar receiver.

Aspect 26: The method of any of Aspects 18 to 25, further comprising: transmitting a request for the message to an additional network entity in communication with the radar receiver.

Aspect 27: The method of any of Aspects 18 to 26, wherein at least the portion of the sensing resources are determined based on sensing measurement accuracy of the radar receiver based on measurements obtained by the radar receiver.

Aspect 28: The method of Aspect 27, further comprising: determining, by the network entity, the sensing measurement accuracy of the radar receiver based on the measurements obtained by the radar receiver.

Aspect 29: The method of any of Aspects 27 or 28, wherein the message comprises the measurements obtained by the radar receiver.

Aspect 30: The method of any of Aspects 27 to 29, wherein the measurements comprise at least one of sensing measurements, light detection and ranging (LIDAR) measurements, ultrasound measurements, or positioning measurements.

Aspect 31: The method of Aspect 30, wherein the sensing measurements are obtained based on at least one of monostatic sensing, bistatic sensing, or multistatic sensing.

Aspect 32: The method of any of Aspects 30 or 31, wherein the sensing measurements comprise at least one of round trip time (RTT) measurements, time of arrival (TOA) measurements, time difference of arrival (TDOA) measurements, angle of arrival (AOA) measurements, or angle of departure (AOD) measurements.

Aspect 33: The method of any of Aspects 18 to 32, wherein the radar receiver is a user equipment (UE) device and the network entity is one of a radar server or a base station.

Aspect 34: The method of any of Aspects 18 to 33, wherein the radar receiver is a base station and the network entity is one of a radar server or an additional base station.

Aspect 35: The method of any of Aspects 18 to 34, wherein the message is received via one of a long-term evolution positioning protocol (LPP), a New Radio Positioning Protocol A (NRPPa), a radio resource control (RRC) protocol, downlink control information (DCI), or a medium access control-control element (MAC-CE).

Aspect 36: The method of any of Aspects 18 to 35, wherein at least the portion of the sensing resources associated with the radar receiver comprises positioning resources.

Aspect 37: A method for resource allocation at a first network entity, the method comprising: receiving, by the first network entity, a resource allocation request from a second network entity for an allocation of sensing resources for communications data; and transmitting, by the first network entity, a message to one or more radar devices, the message including information associated with an allocation of at least a portion of resources associated with the one or more radar devices for the communications data.

Aspect 38: The method of Aspect 37, wherein the message comprises an indication of the allocation of at least the portion of the resources associated with the one or more radar devices for the communications data.

Aspect 39: The method of any of Aspects 37 to 38, wherein the message comprises a request for resources from the one or more radar devices.

Aspect 40: The method of any of Aspects 37 to 39, wherein the message comprises a slot format indicator (SFI).

Aspect 41: The method of Aspect 37, wherein the SFI is transmitted in downlink control information (DCI) of a physical downlink control channel (PDCCH).

Aspect 42: The method of Aspect 41, wherein the DCI comprises an indication of a slot format combination index used for sensing or joint communications and sensing.

Aspect 43: The method of any of Aspects 37 to 42, wherein the message comprises preemption-based signaling.

Aspect 44: The method of Aspect 43, wherein the preemption-based signaling comprises an indication of sensing resources to be allocated for the communications data.

Aspect 45: The method of Aspect 44, wherein the indication of the sensing resources is included in group common downlink control information (GC-DCI).

Aspect 46: The method of any of Aspects 37 to 45, wherein the message is transmitted using a New Radio Positioning Protocol A (NRPPa).

Aspect 47: The method of any of Aspects 37 to 46, further comprising: determining, by the first network entity, a sensing measurement accuracy of the one or more radar devices using measurements obtained by the one or more radar devices.

Aspect 48: The method of Aspect 47, further comprising: determining, by the first network entity, at least the portion of the resources associated with the one or more radar devices based on the sensing measurement accuracy of the one or more radar devices.

Aspect 49: An apparatus for wireless communications, comprising at least one memory and at least one processor (e.g., implemented in circuitry) coupled to the at least one memory. The at least one processor is configured to: determine a sensing measurement accuracy of the apparatus based on one or more measurements associated with at least one target; and output, based on the sensing measurement accuracy, a message for transmission to a network entity, the message including an indication to modify an allocation of sensing resources associated with the apparatus for communications data.

Aspect 50: The apparatus of Aspect 49, wherein the indication to modify the allocation of sensing resources comprises a recommendation for re-allocation of the sensing resources for the communications data.

Aspect 51: The apparatus of any of Aspects 49 to 50, wherein the indication to modify the allocation of sensing resources comprises a recommendation to cancel the sensing resources.

Aspect 52: The apparatus of any of Aspects 49 to 51, wherein the indication to modify the allocation of sensing resources comprises a recommendation to increase or decrease a period of the sensing resources.

Aspect 53: The apparatus of any of Aspects 49 to 52, wherein the indication to modify the allocation of sensing resources comprises a recommendation to reduce a bandwidth of the sensing resources.

Aspect 54: The apparatus of any of Aspects 49 to 53, wherein the indication to modify the allocation of sensing resources comprises a recommendation to reduce a time duration of the sensing resources.

Aspect 55: The apparatus of any of Aspects 49 to 54, wherein the indication to modify the allocation of sensing resources comprises a recommendation to reduce a number of beams for each sensing resource of the sensing resources.

Aspect 56: The apparatus of any of Aspects 49 to 55, wherein the at least one processor is configured to: receive, from the network entity or an additional network entity, a request for the message including the indication to modify the allocation of sensing resources.

Aspect 57: The apparatus of Aspect 56, wherein the network entity is a radar server and the additional network entity is a base station.

Aspect 58: The apparatus of any of Aspects 49 to 57, wherein the message comprises the one or more measurements.

Aspect 59: The apparatus of any of Aspects 49 to 58, wherein the one or more measurements comprise at least one of sensing measurements, light detection and ranging (LIDAR) measurements, ultrasound measurements, or positioning measurements.

Aspect 60: The apparatus of Aspect 59, wherein the sensing measurements are obtained based on at least one of monostatic sensing, bistatic sensing, or multistatic sensing.

Aspect 61: The apparatus of any of Aspects 59 or 60, wherein the sensing measurements comprise at least one of round trip time (RTT) measurements, time of arrival (TOA) measurements, time difference of arrival (TDOA) measurements, angle of arrival (AOA) measurements, or angle of departure (AOD) measurements.

Aspect 62: The apparatus of any of Aspects 49 to 61, wherein the apparatus is a user equipment (UE) device and the network entity is one of a radar server or a base station.

Aspect 63: The apparatus of any of Aspects 49 to 62, wherein the apparatus is a base station and the network entity is one of a radar server or an additional base station.

Aspect 64: The apparatus of any of Aspects 49 to 63, wherein the at least one processor is configured to output the message for transmission using one of a long-term evolution positioning protocol (LPP), a New Radio Positioning Protocol A (NRPPa), a radio resource control (RRC) protocol, downlink control information (DCI), or a medium access control-control element (MAC-CE).

Aspect 65: The apparatus of any of Aspects 49 to 64, wherein the at least one processor is configured to: receive, from the network entity, resource allocation signaling for the communications data based on the indication to modify the allocation of sensing resources associated with the radar receiver for the communications data.

Aspect 66: An apparatus for wireless communications, comprising at least one memory and at least one processor (e.g., implemented in circuitry) coupled to the at least one memory. The at least one processor is configured to: receive a message from a radar receiver, the message including an indication to modify an allocation of sensing resources associated with the radar receiver for communications data; and determine, based on the message, at least a portion of the sensing resources for the communications data.

Aspect 67: The apparatus of Aspect 66, wherein the indication to modify the allocation of sensing resources comprises a recommendation for re-allocation of the sensing resources for the communications data.

Aspect 68: The apparatus of any of Aspects 66 to 67, wherein the indication to modify the allocation of sensing resources comprises a recommendation to cancel the sensing resources.

Aspect 69: The apparatus of any of Aspects 66 to 68, wherein the indication to modify the allocation of sensing resources comprises a recommendation to increase or decrease a period of the sensing resources.

Aspect 70: The apparatus of any of Aspects 66 to 69, wherein the indication to modify the allocation of sensing resources comprises a recommendation to reduce a bandwidth of the sensing resources.

Aspect 71: The apparatus of any of Aspects 66 to 70, wherein the indication to modify the allocation of sensing resources comprises a recommendation to reduce a time duration of the sensing resources.

Aspect 72: The apparatus of any of Aspects 66 to 71, wherein the indication to modify the allocation of sensing resources comprises a recommendation to reduce a number of beams for each sensing resource of the sensing resources.

Aspect 73: The apparatus of any of Aspects 66 to 72, wherein the at least one processor is configured to: output for transmission a request for the message for receipt by the radar receiver.

Aspect 74: The apparatus of any of Aspects 66 to 73, wherein the at least one processor is configured to: output a request for the message for transmission to an additional network entity in communication with the radar receiver.

Aspect 75: The apparatus of any of Aspects 66 to 74, wherein the at least one processor is configured to determine at least the portion of the sensing resources further based on sensing measurement accuracy of the radar receiver based on measurements obtained by the radar receiver.

Aspect 76: The apparatus of Aspect 75, wherein the at least one processor is configured to: determine the sensing measurement accuracy of the radar receiver based on the measurements obtained by the radar receiver.

Aspect 77: The apparatus of any of Aspects 75 or 76, wherein the message comprises the measurements obtained by the radar receiver.

Aspect 78: The apparatus of any of Aspects 75 to 77, wherein the measurements comprise at least one of sensing measurements, light detection and ranging (LIDAR) measurements, ultrasound measurements, or positioning measurements.

Aspect 79: The apparatus of any of Aspects 75 to 78, wherein the sensing measurements are obtained based on at least one of monostatic sensing, bistatic sensing, or multistatic sensing.

Aspect 80: The apparatus of any of Aspects 75 to 79, wherein the sensing measurements comprise at least one of round trip time (RTT) measurements, time of arrival (TOA) measurements, time difference of arrival (TDOA) measurements, angle of arrival (AOA) measurements, or angle of departure (AOD) measurements.

Aspect 81: The apparatus of any of Aspects 66 to 80, wherein the radar receiver is a user equipment (UE) device and the apparatus is one of a radar server or a base station.

Aspect 82: The apparatus of any of Aspects 66 to 81, wherein the radar receiver is a base station and the apparatus is one of a radar server or an additional base station.

Aspect 83: The apparatus of any of Aspects 66 to 82, wherein the at least one processor is configured to receive the message via one of a long-term evolution positioning protocol (LPP), a New Radio Positioning Protocol A (NRPPa), a radio resource control (RRC) protocol, downlink control information (DCI), or a medium access control-control element (MAC-CE).

Aspect 84: The apparatus of any of Aspects 66 to 83, wherein at least the portion of the sensing resources associated with the radar receiver comprises positioning resources.

Aspect 85: An apparatus for wireless communications, comprising at least one memory and at least one processor (e.g., implemented in circuitry) coupled to the at least one memory. The at least one processor is configured to: receive a resource allocation request from a second network entity for an allocation of sensing resources for communications data; and output a message for transmission to one or more radar devices, the message including information associated with an allocation of at least a portion of resources associated with the one or more radar devices for the communications data.

Aspect 86: The apparatus of Aspect 85, wherein the message comprises an indication of the allocation of at least the portion of the resources associated with the one or more radar devices for the communications data.

Aspect 87: The apparatus of any of Aspects 85 to 86, wherein the message comprises a request for resources from the one or more radar devices.

Aspect 88: The apparatus of any of Aspects 85 to 87, wherein the message comprises a slot format indicator (SFI).

Aspect 89: The apparatus of Aspect 88, wherein the at least one processor is configured to output the SFI for transmission in downlink control information (DCI) of a physical downlink control channel (PDCCH).

Aspect 90: The apparatus of Aspect 89, wherein the DCI comprises an indication of a slot format combination index used for sensing or joint communications and sensing.

Aspect 91: The apparatus of any of Aspects 85 to 90, wherein the message comprises preemption-based signaling.

Aspect 92: The apparatus of Aspect 91, wherein the preemption-based signaling comprises an indication of sensing resources to be allocated for the communications data.

Aspect 93: The apparatus of Aspect 92, wherein the indication of the sensing resources is included in group common downlink control information (GC-DCI).

Aspect 94: The apparatus of any of Aspects 85 to 93, wherein the at least one processor is configured to: output the message for transmission using a New Radio Positioning Protocol A (NRPPa).

Aspect 95: The apparatus of any of Aspects 85 to 94, wherein the at least one processor is configured to: determine a sensing measurement accuracy of the one or more radar devices using measurements obtained by the one or more radar devices.

Aspect 96: The apparatus of Aspect 95, wherein the at least one processor is configured to: determine at least the portion of the resources associated with the one or more radar devices based on the sensing measurement accuracy of the one or more radar devices.

Aspect 97: The apparatus of Aspect 49, wherein the apparatus is configured as a user equipment (UE) or an additional network entity, and further comprising: a transceiver configured to transmit the message.

Aspect 98: The apparatus of Aspect 66, wherein the apparatus is configured as a network entity, and further comprising: a transceiver configured to receive the message.

Aspect 98: The apparatus of Aspect 85, wherein the apparatus is configured as an additional network entity, and further comprising: a transceiver configured to receive the resource allocation request and transmit the message.

Aspect 99: A non-transitory computer-readable medium of a network entity having stored thereon instructions that, when executed by one or more processors, cause the one or more processors to perform operations according to any of Aspects 1 to 17.

Aspect 100: An apparatus for wireless communications comprising one or more means for performing operations according to any of Aspects 1 to 17.

Aspect 101: A non-transitory computer-readable medium of a network entity having stored thereon instructions that, when executed by one or more processors, cause the one or more processors to perform operations according to any of Aspects 18 to 36.

Aspect 102: An apparatus for wireless communications comprising one or more means for performing operations according to any of Aspects 18 to 36.

Aspect 103: A non-transitory computer-readable medium of a network entity having stored thereon instructions that, when executed by one or more processors, cause the one or more processors to perform operations according to any of Aspects 37 to 48.

Aspect 104: An apparatus for wireless communications comprising one or more means for performing operations according to any of Aspects 37 to 48.

Aspect 105: A non-transitory computer-readable medium of a network entity having stored thereon instructions that, when executed by one or more processors, cause the one or more processors to perform operations according to any of Aspects 37 to 48.

Aspect 106: An apparatus for wireless communications comprising one or more means for performing operations according to any combination of Aspects 1 to 48.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A method for wireless communications at radar receiver, the method comprising:
   receiving a reflection signal associated with at least one target object, the reflection signal being based on a transmitted signal reflecting off of the at least one target object;
   determining a sensing measurement accuracy of the radar receiver based on one or more measurements associated with the reflection signal associated with the at least one target object and performance metrics for the radar receiver;
   determining, based on the sensing measurement accuracy, sensing resources scheduled for the radar receiver that are not needed to determine one or more characteristics of the at least one target object; and
   transmitting, by the radar receiver, a message over a physical wireless communication link to a network entity, the message including control information that causes the network entity to modify a radio-frequency resource allocation assigned to the radar receiver for reconfiguring at least one physical transmission or reception parameter of the radar receiver for subsequent sensing or data communication operations.

2. The method of claim 1, wherein the message comprises a recommendation for re-allocation of the sensing resources for the subsequent sensing or data communication operations.

3. The method of claim 1, wherein the message comprises a recommendation to cancel the sensing resources.

4. The method of claim 1, wherein the message comprises a recommendation to increase or decrease a period of the sensing resources.

5. The method of claim 1, wherein the message comprises a recommendation to reduce a bandwidth of the sensing resources.

6. The method of claim 1, wherein the message comprises a recommendation to reduce a time duration of the sensing resources.

7. The method of claim 1, wherein the message comprises a recommendation to reduce a number of beams for each sensing resource of the sensing resources.

8. The method of claim 1, further comprising:
   receiving, from the network entity or an additional network entity, a request for the message.

9. The method of claim 8, wherein the network entity is a radar server and the additional network entity is a base station.

10. The method of claim 1, wherein the message comprises the one or more measurements.

11. The method of claim 1, wherein the one or more measurements comprise at least one of sensing measurements, light detection and ranging (LIDAR) measurements, ultrasound measurements, or positioning measurements.

12. The method of claim 11, wherein the sensing measurements are obtained based on at least one of monostatic sensing, bistatic sensing, or multistatic sensing.

13. The method of claim 12, wherein the sensing measurements comprise at least one of round trip time (RTT) measurements, time of arrival (TOA) measurements, time difference of arrival (TDOA) measurements, angle of arrival (AOA) measurements, or angle of departure (AOD) measurements.

14. The method of claim 1, wherein the radar receiver is a user equipment (UE) device and the network entity is one of a radar server or a base station.

15. The method of claim 1, wherein the radar receiver is a base station and the network entity is one of a radar server or an additional base station.

16. The method of claim 1, wherein the message is transmitted using one of a long-term evolution positioning protocol (LPP), a New Radio Positioning Protocol A (NRPPa), a radio resource control (RRC) protocol, downlink control information (DCI), or a medium access control-control element (MAC-CE).

17. The method of claim 1, further comprising:
  receiving, at the radar receiver from the network entity, resource allocation signaling for the subsequent sensing or data communication operations based on the message.

18. An apparatus for wireless communications, comprising:
  at least one memory; and
  at least one processor coupled to the at least one memory, the at least one processor configured to:
    receive a reflection signal associated with at least one target object, the reflection signal being based on a transmitted signal reflecting off of the at least one target object;
    determine a sensing measurement accuracy of the apparatus based on one or more measurements associated with the reflection signal associated with the at least one target object and performance metrics for the apparatus;
    determine, based on the sensing measurement accuracy, sensing resources scheduled for the apparatus that are not needed to determine one or more characteristics of the at least one target object; and
    output, based on the sensing measurement accuracy, a message for transmission over a physical wireless communication link to a network entity, the message including control information that causes the network entity to modify a radio-frequency resource allocation assigned to the apparatus for reconfiguring at least one physical transmission or reception parameter of a radar receiver for subsequent sensing or data communication operations.

19. The apparatus of claim 18, wherein the message comprises a recommendation for re-allocation of the sensing resources for the subsequent sensing or data communication operations.

20. The apparatus of claim 18, wherein the message comprises a recommendation to cancel the sensing resources.

21. The apparatus of claim 18, wherein the message comprises a recommendation to increase or decrease a period of the sensing resources.

22. The apparatus of claim 18, wherein the message comprises a recommendation to reduce a bandwidth of the sensing resources.

23. The apparatus of claim 18, wherein the message comprises a recommendation to reduce a time duration of the sensing resources.

24. The apparatus of claim 18, wherein the message comprises a recommendation to reduce a number of beams for each sensing resource of the sensing resources.

25. The apparatus of claim 18, wherein the at least one processor is configured to receive, from the network entity or an additional network entity, a request for the message.

26. The apparatus of claim 25, wherein the network entity is a radar server and the additional network entity is a base station.

27. The apparatus of claim 18, wherein the one or more measurements comprise at least one of sensing measurements, light detection and ranging (LIDAR) measurements, ultrasound measurements, or positioning measurements, wherein the sensing measurements are obtained based on at least one of monostatic sensing, bistatic sensing, or multistatic sensing, and wherein the sensing measurements comprise at least one of round trip time (RTT) measurements, time of arrival (TOA) measurements, time difference of arrival (TDOA) measurements, angle of arrival (AOA) measurements, or angle of departure (AOD) measurements.

28. The apparatus of claim 18, wherein the apparatus is a user equipment (UE) device and the network entity is one of a radar server or a base station.

29. The apparatus of claim 18, wherein the apparatus is a base station and the network entity is one of a radar server or an additional base station.

30. The apparatus of claim 18, wherein the at least one processor is configured to output the message for transmission using one of a long-term evolution positioning protocol (LPP), a New Radio Positioning Protocol A (NRPPa), a radio resource control (RRC) protocol, downlink control information (DCI), or a medium access control-control element (MAC-CE).

* * * * *